United States Patent
Aoki et al.

(10) Patent No.: US 7,533,083 B2
(45) Date of Patent: May 12, 2009

(54) DEVICE, SYSTEM AND COMPUTER PROGRAM PRODUCT FOR RETRIEVING INFORMATION

(75) Inventors: Kazuma Aoki, Kasugai (JP); Yuji Sato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 374 days.

(21) Appl. No.: 11/217,428

(22) Filed: Sep. 2, 2005

(65) Prior Publication Data
US 2006/0048190 A1   Mar. 2, 2006

(30) Foreign Application Priority Data
Sep. 2, 2004   (JP)   ............... 2004-256328

(51) Int. Cl.
*G06F 17/30*   (2006.01)
*G06F 7/00*   (2006.01)

(52) U.S. Cl. .................. 707/3; 707/6; 707/10; 705/9
(58) Field of Classification Search .................. None
See application file for complete search history.

(56) References Cited

U.S. PATENT DOCUMENTS

| | | | | | |
|---|---|---|---|---|---|
| 5,070,470 | A | * | 12/1991 | Scully et al. .................. | 708/112 |
| 6,272,074 | B1 | * | 8/2001 | Winner .......................... | 368/10 |
| 2002/0013724 | A1 | * | 1/2002 | Kudo et al. .................... | 705/9 |
| 2002/0013729 | A1 | * | 1/2002 | Kida ............................. | 705/14 |
| 2002/0194246 | A1 | * | 12/2002 | Moskowitz et al. .......... | 709/102 |
| 2003/0163416 | A1 | * | 8/2003 | Kitajima ....................... | 705/39 |
| 2003/0217072 | A1 | * | 11/2003 | Tsumura ....................... | 707/102 |
| 2004/0039630 | A1 | * | 2/2004 | Begole et al. ................. | 705/11 |
| 2004/0078252 | A1 | * | 4/2004 | Daughtrey et al. ............ | 705/5 |
| 2004/0249693 | A1 | * | 12/2004 | Sako ............................. | 705/8 |
| 2005/0027742 | A1 | * | 2/2005 | Eichstaedt et al. ........ | 707/104.1 |
| 2005/0055252 | A1 | * | 3/2005 | Todd ............................. | 705/5 |
| 2005/0261950 | A1 | * | 11/2005 | McCandliss .................. | 705/9 |

FOREIGN PATENT DOCUMENTS

| | | |
|---|---|---|
| JP | 09-212516 A | 8/1997 |
| JP | 009252368 | 9/1997 |
| JP | 2000-172462 A | 6/2000 |
| JP | 2000-307793 | 11/2000 |

(Continued)

OTHER PUBLICATIONS

"PIM-point.com" [online], by i-face Inc., <URL:http://ww.pim-point.com/service/index.html>, printed Feb. 16, 2005.

(Continued)

*Primary Examiner*—Tim T. Vo
*Assistant Examiner*—Jay A Morrison
(74) *Attorney, Agent, or Firm*—Banner & Witcoff, Ltd.

(57) ABSTRACT

An information-retrieval system is provided with a schedule storing system that stores schedule information regarding a schedule of a user, a service information storing system that stores pieces of service information respectively corresponding to types of services; and a searching system that searches the pieces of service information for at least one piece of matched information of the pieces of service information matching the schedule information of the user.

17 Claims, 19 Drawing Sheets

FOREIGN PATENT DOCUMENTS

| | | |
|---|---|---|
| JP | 200307793 | 11/2000 |
| JP | 2002024492 A | 1/2002 |
| JP | 2002-41964 A | 2/2002 |
| JP | 2002041737 | 2/2002 |
| JP | 2002189656 | 7/2002 |
| JP | 2003-50938 A | 2/2003 |
| JP | 2003345952 | 12/2003 |
| JP | 2004038580 | 2/2004 |
| JP | 2004054799 | 2/2004 |
| JP | 2004227490 A | 8/2004 |

OTHER PUBLICATIONS

Office Action from corresponding Japanese application 2004-256328, dated May 20, 2008.

Notification of Reasons of Rejection from corresponding Japanese application 2004-256328, dated Sep. 16, 2008.

Office Action from corresponding Japanese application 2004-256328, dated May 13, 2008.

* cited by examiner

FIG. 3

SCHEDULE INFORMATION

| FIELD | EXPLANATION |
|---|---|
| START DATE | Start date of event |
| END DATE | End date of event |
| TYPE | The type of event represented by "business" or "private" |
| PLACE | Represented by Country, Province, City, Address, Place name<br>Another representation is possible. |
| PERMISSITION/INHIBITION OF PUBLICATION | Information as to whether the publication is permitted or not.<br>Represented by a word "permission" or "inhibition". |
| PARTNER | Name of partner(Space data is acceptable) |
| COMMENTS | Comments on event(Space data is acceptable) |
| SEARCH RESULT | Links to a plurality of search result records |

FIG.4A

PERSONAL INFORMATION

| FIELD | EXPLANATION |
|---|---|
| NAME | Name to specify user in system |
| PASSWORD | Password for user authentication |
| ADDRESS | Represented by Country, Province, City, Street, Block Number<br>Another representation is possible. |
| INTERESTING BUSINESS KEYWORD | List of keywords to be used if Type is "business" |
| INTERESTING PRIVATE KEYWORD | List of keywords to be used if Type is "private" |
| INTERESTING BUSINESS PARTNER | List of partners to be used if Type is "business" |
| INTERESTING PRIVATE PARTNER | List of partners to be used if Type is "private" |
| COLOR OF INDICATION LAMP | Color of indication lamp which is turned on if information from the server is received |
| AUTOMATIC PRINTING | Setting as to whether to automatically print out information from the server. |
| AUTOMATIC TRANSFERRING | Destination to Which information from server is to be sent. |

FIG.4B

INTERESTING PARTNER

| FIELD | EXPLANATION |
|---|---|
| NAME | Name to specify user in system |
| RANGE OF PLACE | Range regarding a place(e.g., "City")used in a searching operation searching for another user's schedule. |

FIG. 5

SERVICE INFORMATION

| FIELD | EXPLANATION |
| --- | --- |
| START DATE | Start date of event |
| END DATE | End date of event |
| TYPE | The type of event represented by "business" or "private" |
| PLACE | Represented by Country, Province, Place name<br>Another representation is possible. |
| KEYWORD | list of keywords set by provider |
| EXECUTION PROGRAM ADDRESS | Address of program to be executed when this information is selected. |
| TITLE | Title of service |
| CATEGORY | Category of service |

FIG. 6

SEARCH RESULT

| FIELD | EXPLANATION |
|---|---|
| START DATE | Start date of event |
| END DATE | End date of event |
| TITLE | Title to be notified to user.<br>Title of service, or request for making an appointment sent by another user |
| EXECUTION PROGRAM | Program to be executed when this service is selected. Definition regarding the display of a text on the display unit, an interface of buttons or data inputs, information transformation, data storing, and data transmission to a server are included. |
| CATEGORY | Category of the service is included.<br>If the search result relates to the schedule of another user, a human connection may be included in this field. |
| STATUS | "to be read", "already read" or "to be deleted" |

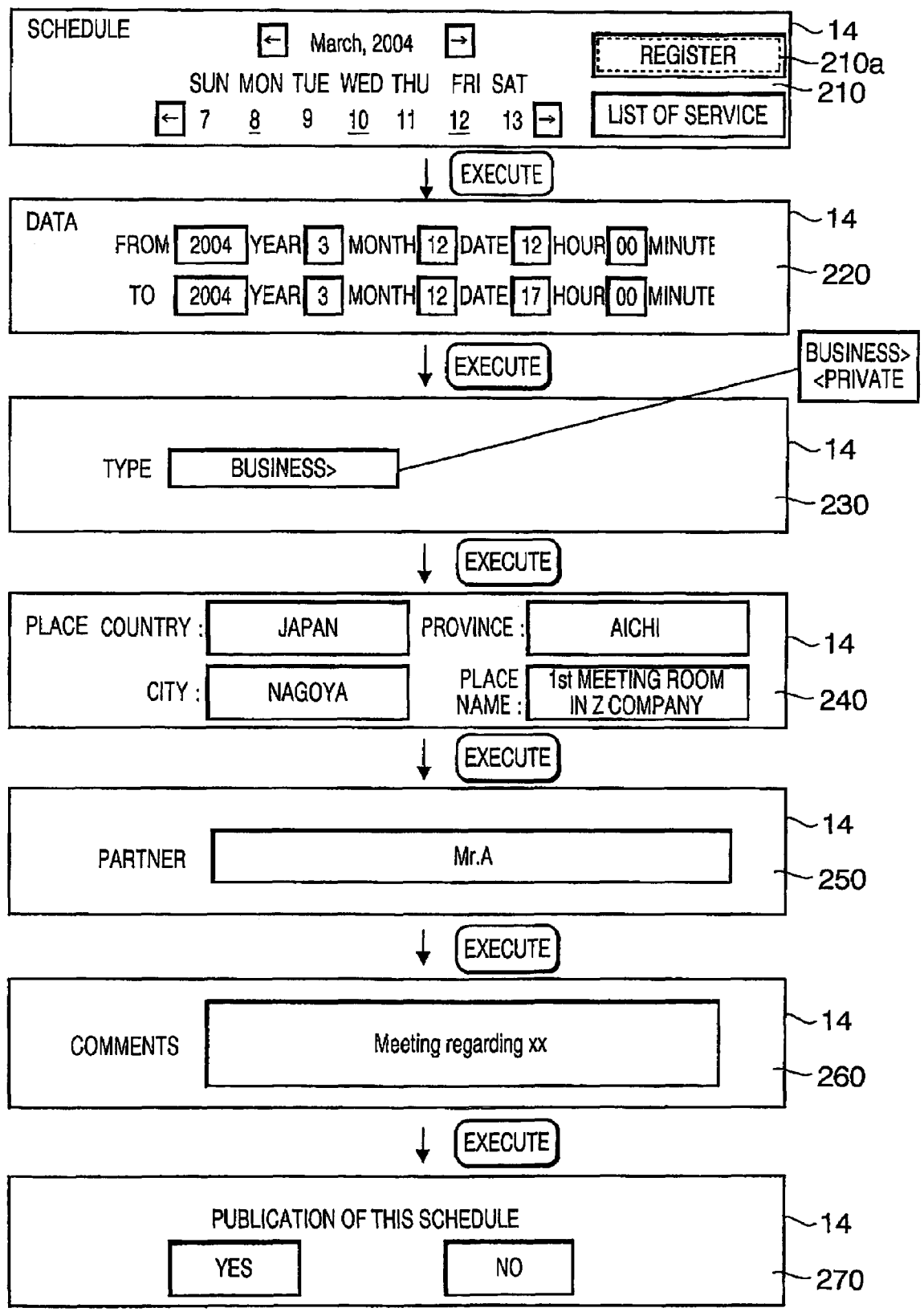

```
                                    ┌─300
                    ┌──────────────────────────────────┐
                    │  DATA    [2004] YEAR [1] MONTH [1] DATE [00] HOUR [00] MINUTE
                    │          [2004] YEAR [12] MONTH [31] DATE [17] HOUR [00] MINUTE        ┌──────────┐
                    │                                                                         │ NON-TYPE │
                    │  TYPE          [  NON-TYPE  ]────────────────────────────────           │<BUSINESS>│
                    │                                                                         │ <PRIVATE │
                    │  PLACE COUNTRY:  [ JAPAN ]   PROVINCE:  [ AICHI ]                       └──────────┘
                    │         CITY:    [ NAGOYA ]  PLACE NAME: [      ]
                    │
                    │  KEYWORD    [ TRAVEL, TRANSPORTATION, BOOKING, BUSINESS TRAVEL ]
                    │
                    │  PROGRAM    [ http://www.•••.net/cgi•bin/trip              ]
                    │  ADDRESS
                    │
                    │  TITLE      [ DISCOUNT TICKET TO NAGOYA                    ]
                    │
                    │  CATEGORY   [ TRANSPORTATION                               ]
                    │
                    │         [ TRANSMISSION ]    [ RESET ]
                    └──────────────────────────────────┘
```

FIG. 10

DEVICE, SYSTEM AND COMPUTER PROGRAM PRODUCT FOR RETRIEVING INFORMATION

CROSS-REFERENCE TO RELATED APPLICATION

This application claims priority under 35 U.S.C. §119 from Japanese Patent Application No. 2004-256328, filed on Sep. 2, 2004, the entire subject matter of the application being incorporated herein by reference.

BACKGROUND

1. Technical Field (00021 The present invention relates to a system which provides information matching a schedule of a user.

2. Description of Related Art

A system having a function of generating a database containing a user schedule and printing (or displaying) the user schedule contained in the database is widely used. A network system which allows a plurality of users to store (update) and view user schedules through a network has been proposed.

In a web site provided at a network address of <URL:http://www.pim-point.com/service/index.html>("PIM-point-.com", i-face Inc.), a system having a function of managing schedule information on a network is disclosed. In this system, a server operates to manage pieces of schedule information of multiple users. By using a terminal connected to the server through the network, a user is able to view her own schedule information and to update her schedule information.

According to the system disclosed in the web site, pieces of schedule information respectively inputted by the users are shared by the users through the server. That is, one of the users is able to view or update the schedule information of another user. Further, according to the system disclosed in the web site, a user is allowed to register keywords regarding her favorite pursuits into the system. The system operates to select service information using the keywords registered by the user and to deliver the selected service information to the user.

However, the system mentioned above has a drawback that the service information provided to the user reflects only the keywords registered by the user. That is, the system can not provide information which matches a user schedule such as a time, place and purpose of an event.

For example, to obtain information such as a status of reservation regarding public transport or accommodation facilities for a business trip or private travel, or information regarding a local event, beneficial information of a place where one is staying while on a journey, the user needs to operate a device (e.g., a user's terminal device) to access a server that provides an information-retrieval service. That is, the user herself needs to search for information matching her schedule. Such an operation is very troublesome for the user.

Another drawback of the above mentioned system is that if a user wants to know schedules of persons whom the user is not able to meet at frequent intervals, the user is required to operate her device to retrieve the desired schedule information. Such an operation is very troublesome for the user.

SUMMARY

At least some aspects of the present invention may be advantageous in that a system, device, method and computer program product are provided, which are configured to provide beneficial information matching a user's schedule based on schedule information registered by the user.

BRIEF DESCRIPTION OF THE DRAWINGS

FIG. 3 is an explanatory illustration of a record of a piece of schedule information which is information regarding a schedule of a user;

FIG. 4A is an explanatory illustration of a record of a piece of personal information which is information regarding a schedule of a user;

FIG. 4B is an explanatory illustration of a record of an "interesting business or private partner" field shown in FIG. 4A;

FIG. 5 is an explanatory illustration of a record of a piece of service information which is information regarding a service of a provider;

FIG. 6 is an explanatory illustration of a record of a search result;

FIG. 9 illustrates an example of transition of a screen displayed on the display unit of the multifunction device during a schedule input process;

FIG. 10 illustrates an example of transition of a screen displayed on the display unit of the multifunction device during a registration process of service information;

DETAILED DESCRIPTION

Figure 1:
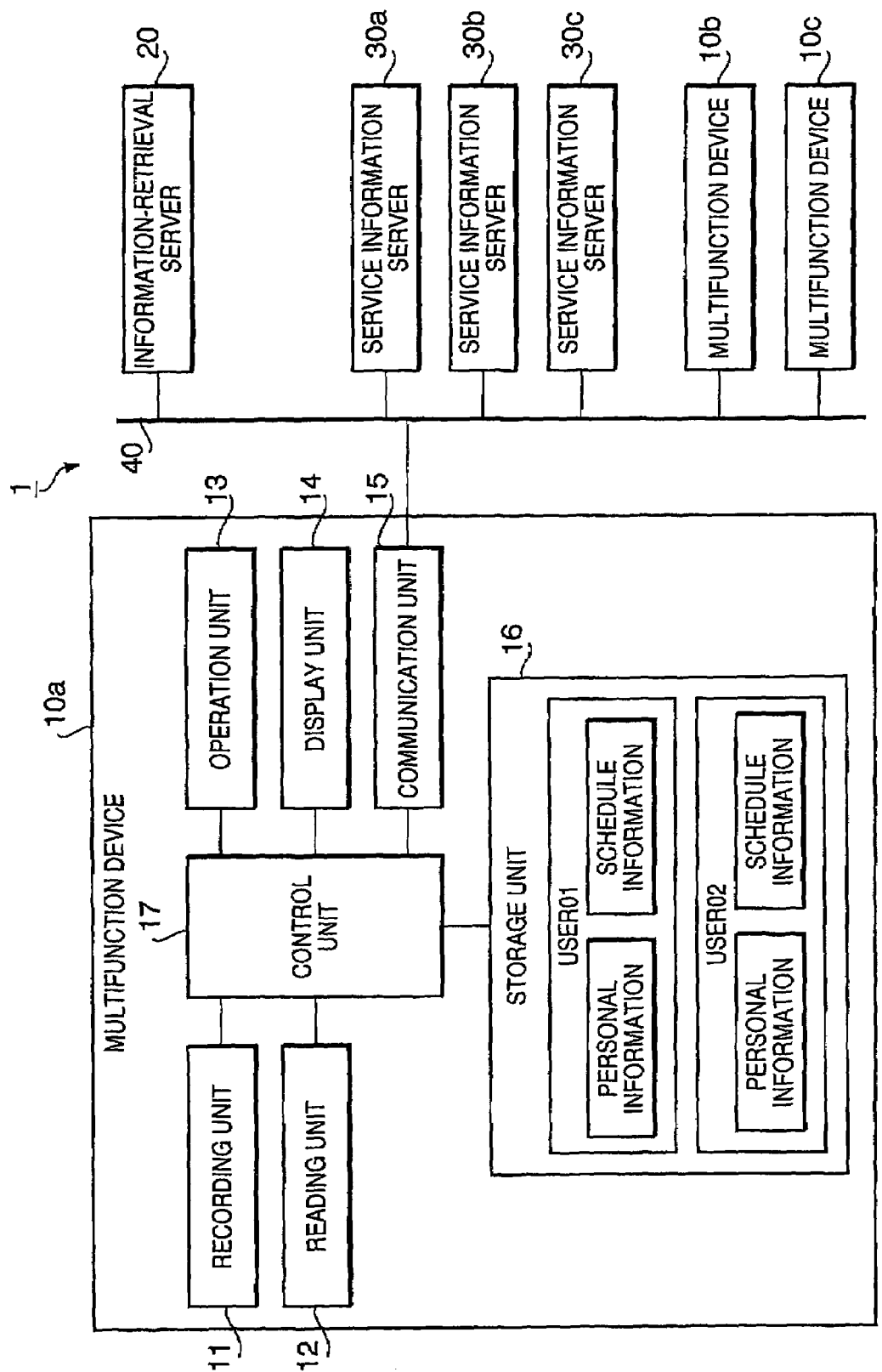
FIG. 1 is a block diagram illustrating a general configuration of an information-retrieval system according to an illustrative embodiment of the invention.

General Overview of Aspects of the Invention

According to an aspect of the invention, there is provided an information-retrieval system, which is provided with a schedule storing system that stores schedule information regarding a schedule of a user, a service information storing system that stores pieces of service information respectively corresponding to types of services; and a searching system that searches the pieces of service information for at least one piece of matched information of the pieces of service information matching the schedule information of the user.

With this configuration, it is possible to retrieve beneficial information matching the user's schedule by only registering the schedule information.

Optionally, the schedule information may include at least one of a date, a type and a place of the schedule. In this case, each of the pieces of service information may include at least one of a date, a type and a place of a corresponding service. The searching system may search for the at least one matched information by comparing the at least one of the date, the type and the place of the schedule with the at least one of the date, the type and the place of each of the types of services and using a result of the comparing.

Since the schedule information includes at least one of a date, a type and a place of the schedule, beneficial information matching one of the date, the type and the place of the schedule can be obtained.

Still optionally, the schedule information may include a date, a type and a place of the schedule. In this case, each of the pieces of service information may include a date, a type and a place of a corresponding service. The searching system may search for the at least one matched information by comparing the date, the types and the place of the schedule with the date, the type and the place of each of the types of services, respectively, and using a result of the comparing.

With this configuration, it is possible to provide the user with beneficial information matching the date, the type and the place of the schedule.

Still optionally, if at least one of the date, the type and the place of the schedule matches one of the pieces of service information, the searching system may treat the one of the pieces of service information as the at least one matched information.

With this configuration, if at least one of the date, the type and the place of the schedule matches one of the pieces of service information, the at least one matched information is obtained.

Still optionally, the information-retrieval system may include a personal information storing system that stores personal information of the user. In this case, at least one keyword may be related to the personal information, and each of the pieces of service information may include a keyword regarding a corresponding service. If at least one of the date, the type and the place of the schedule matches one of the pieces of service information, and the at least one keyword of the personal information matches the keyword of the one of the pieces of service information, the searching system may treat the one of the pieces of service information as the at least one matched information.

Since the keyword is considered in searching for the at least one matched information, it is possible to provide the matched information further suited to the user's interest.

Still optionally, the at least one keyword related to the personal information may include keywords classified according to the type of the schedule. If at least one of the date, the type and the place of the schedule matches one of the pieces of service information, and the at least one keyword of the personal information corresponding to the type of the schedule matches the keyword of the one of the pieces of service information, the searching system may treat the one of the pieces of service information as the at least one matched information.

Since the keywords are classified according to the type of the schedule, it becomes possible to consider the keyword corresponding to the type of the schedule in searching for the matched information.

Still optionally, the information-retrieval system may include an outputting system that outputs information obtained based on the at least one matched information.

With this configuration, it becomes possible to provide the user with information obtained based on the at least one matched information, for example, by notifying the user of a notification obtained based on the at least one matched information.

Still optionally, the information-retrieval system may include an information input and output device which is provided with an inputting system that allows the user to input the schedule information, a registering system that registers the schedule information inputted by the user through use of the inputting system, an information requesting system that request the searching system to start a searching operation at a predetermined time, an information receiving system that receives the information outputted by the outputting system, a received data storing system that stores the information received by the information receiving system, an image forming system that forms an image on a recording medium based on the information stored by the received data storing system, and a displaying system that displays an image based on the information stored by the received data storing system.

With this configuration, the user can input (or update) the schedule information and view the image based on the information stored by the received data storing system using the information input and output device.

According to another aspect of the invention, there is provided an information-retrieval system, which is provided with a schedule storing system that stores pieces of schedule information respectively corresponding to schedules of multiple users, a service information storing system that stores pieces of service information respectively corresponding to types of services, and a searching system that searches the pieces of service information for at least a piece of matched information matching the one of the pieces of schedule information.

With this configuration, it is possible to retrieve beneficial information matching the user's schedule by only registering the schedule information.

According to another aspect of the invention there is provided an information-retrieval system, which is provided with a schedule storing system that stores pieces of schedule information respectively corresponding to schedules of multiple users, and a searching system that searches the pieces of schedule information to obtain at least one piece of matched information of the pieces of schedule information matching a first one of the pieces of schedule information corresponding to a first user.

With this configuration, it is possible to retrieve another user's (the second user's) schedule information matching the first user's schedule by only registering the schedule information. The user is not required to search for another user's schedule by operating a device. For example, if the users are members who are to move to a place to attend a meeting, the user (the first user) can know the other member's schedules without performing a troublesome operation for checking another user's schedule.

Optionally, the information-retrieval system may include an outputting system that outputs information obtained based on the at least one matched information.

With this configuration, it becomes possible to provide the user with information obtained based on the at least one matched information, for example, by notifying the user of a notification obtained based on the at least one matched information.

Still optionally, the information-retrieval system may include a personal information storing system that stores pieces of personal information respectively corresponding to the users. In this case, each of the pieces of personal information may include human connection information specifying at least one related user. The searching system may search a part of the pieces of schedule information corresponding to the at least one related user specified in the human connection information of the first user to obtain the at least one matched information matching the first one of the pieces of schedule information belonging to the first user.

With this configuration, it is possible to provide the user with beneficial information considering the human connection of the user (the first user).

Still optionally, each of the pieces of schedule information may include a date, a type and a place of a corresponding schedule. If at least one of the date, the type and the place of the first one of the pieces of schedule information belonging to the first user matches a second one of the pieces of schedule information, the searching system may treats the second one as the at least one matched information.

With this configuration, it is possible to provide the user with beneficial information matching the date, the type and the place of the schedule.

In one example, the at least one related user specified in the human connection information may be classified according to the type of the corresponding schedule. The part of the pieces of schedule information to be searched by the searching system may be limited by the at least one related user classified according to the type of the corresponding schedule of the first user.

With this configuration, it is possible to further consider the type of the schedule in searching for the matched information using the human connection.

Optionally, at least one keyword may be related to each of the pieces of personal information. If at least one of the date, the type and the place of the first one of the pieces of schedule information belonging to the first user matches the second one of the pieces of schedule information, and the at least one keyword of the first one of the pieces of schedule information matches the at least one keyword of the second one of the pieces of schedule information, then the searching system may treat the second one as the at least one matched information.

Since the keyword is considered in searching for the at least one matched information, it is possible to provide the matched information further suited to the user's interest.

Still optionally, the at least one keyword related to each of the pieces of personal information may be classified according to the type of a corresponding one of the pieces of schedule information. If at least one of the date, the type and the place of the first one of the pieces of schedule information belonging to the first user matches the second one of the pieces of schedule information, and the at least one keyword classified according to the type of the first one of the pieces of schedule information matches the at least one keyword classified according to the type of the second one of the pieces of schedule information, then the searching system may treat the second one as the at least one of matched information.

Since the keyword is classified according to the type of the schedule, it becomes possible to consider the keyword corresponding to the type of the schedule in searching for the matched information.

Still optionally, each of the pieces of schedule information may include publication information defining permission or inhibition of publication thereof. In this case, the searching system may search the pieces of schedule information having the publication information being defined as permitting the publication to obtain the at least one matched information.

With this configuration, it is possible, in searching for the matched information, to consider only the schedule information having the publication information being defined as permitting publication.

Still optionally, the information-retrieval system may include an information input and output device, which is provided with an inputting system that allows one of the users to input or update one of the pieces of schedule information and one of the pieces of personal information, an inputted information registering system that registers one of the pieces of schedule information and one of the pieces of personal information inputted by the user through use of the inputting system in the schedule information storing system and the personal information storing system, respectively, an information requesting system that request the searching system to start a searching operation at a predetermined time, an information receiving system that receives the information outputted by the outputting system, a received data storing system that stores the information received by the information receiving system, an image forming system that forms an image on a recording medium based on the information stored by the received data storing system, and a displaying system that displays an image based on the information stored by the received data storing system.

With this configuration, the user can input (or update) the schedule information and view the image based on the information stored by the received data storing system using the information input and output device.

Still optionally, the information requesting system may request the searching system to start the searching operation when one of the pieces of schedule information is inputted or updated by a corresponding user and the inputted or updated one of the pieces of schedule information is registered in the schedule information storing system.

With this configuration, it is possible to start the searching at a desirable timing for the user.

Still optionally, the information outputted by the outputting system may be a notification that the at least one matched information is searched.

With this configuration, the information outputted by the outputting system is provided to the user as a notification.

Still optionally, the received data storing system may relate the information received by the information receiving system to a corresponding one of the pieces of schedule information.

With this configuration, the matched information can be obtained in a condition where the matched information is related to the user's schedule.

Still optionally, the personal information may include information as to whether to automatically start an image forming operation. If first one of the pieces of personal information corresponding to the first user includes the information indicating that the image forming operation should be executed automatically, the image forming system may form the image automatically.

With this configuration, it becomes possible to quickly obtain the image.

Still optionally, the information input and output device may include a transferring system that transfers the information stored by the received data storing system to a destination device.

Since the information stored by the received data can be transferred, it becomes possible to view the received data using a remote device (or a mobile device) of the user (first user) when the user is moved to a place far away from the information input and output device.

According to another aspect of the invention, there is provided a device used in association with the information-retrieval system as mentioned above. The device includes an inputting system that allows one of the users to input or update one of the pieces of schedule information and one of the pieces of personal information, an inputted information registering system that registers one of the pieces of schedule information and one of the pieces of personal information inputted by the user through use of the inputting system in the schedule information storing system and the personal information storing system, respectively, an information requesting system that requests the searching system to start a searching operation at a predetermined time, an information receiving system that receives the information outputted by the outputting system, a received data storing system that stores the information received by the information receiving system; an image forming system that forms an image on a recording medium based on the information stored by the received data storing system, and a displaying system that displays an image based on the information stored by the received data storing system.

With this configuration, the user can input (or update) the schedule information and view the image based on the information stored by the received data storing system using the information input and output device.

According to another aspect of the invention, there is provided a computer program product comprising computer-readable instructions that causes a computer to execute the steps of storing schedule information regarding a schedule of a user, storing pieces of service information respectively corresponding to types of services, and searching the pieces of service information for at least one matched information of the pieces of service information matching the schedule information of the user, and providing the user with the at least one matched information.

With this configuration, it is possible to retrieve beneficial information matching the user's schedule by only registering the schedule information.

According to another aspect of the invention, there is provided a method of retrieving information, including the steps of storing schedule information regarding a schedule of a user, storing pieces of service information respectively corresponding to types of services, searching the pieces of service information for at least one matched information of the pieces of service information matching the schedule information of the user, and providing the user with the at least one matched information.

With this configuration, it is possible to retrieve beneficial information matching the user's schedule by only registering the schedule information.

According to another aspect of the invention, there is provided a computer program product comprising computer-readable instructions that causes a computer to execute the steps of storing pieces of schedule information respectively corresponding to schedules of multiple users, searching the pieces of schedule information to obtain at least one matched information of the pieces of schedule information matching a first one of the pieces of schedule information corresponding to a first user, and providing the user with the at least one matched information.

With this configuration, it is possible to retrieve another user's (the second user's) schedule information matching the first user's schedule by only registering the schedule information.

According to another aspect of the invention, there is provided a method of retrieving information, including the steps of storing pieces of schedule information respectively corresponding to schedules of multiple users, searching the pieces of schedule information to obtain at least one matched information of the pieces of schedule information matching a first one of the pieces of schedule information corresponding to a first user, and providing the user with the at least one matched information.

With this configuration, it is possible to retrieve another user's (the second user's) schedule information matching the first user's schedule by only registering the schedule information.

According to another aspect of the invention, there is provided an information-retrieval system, which is provided with a schedule storing system that stores schedule information to which a first item of data regarding a schedule of a user is related, an information storing system that stores pieces of information, each of the pieces of information includes a second item of data corresponding to the first item of data, and a searching system that searches the pieces of information for at least one piece of matched information of the pieces of information having the second item of data matching the first item of data of the schedule information of the user.

With this configuration, it is possible to retrieve matched information matching the user's schedule by only registering the schedule information.

Illustrative Embodiments

Hereafter, an illustrative embodiment according to the invention will be described with reference to the accompanying drawings.

FIG. 1 is a block diagram illustrating a general configuration of an information-retrieval system 1 according to an illustrative embodiment of the invention. The information-retrieval system 1 includes multifunction devices 10a, 10b and 10c, an information-retrieval server 20, and service information servers 30a, 30b and 30c which are connected to one another via a network 40. Since the multifunction devices 10a, 10b and 10c have the same configuration, a numerical reference "10" is frequently used hereafter when the explanation common to all of the multifunction devices 10a, 10b and 10c is made. Also, since the service information servers 30a, 30b and 30c have the same configuration, a numerical reference "30" is frequently used hereafter when the explanation common to all of the servers 30a, 30b and 30c is made.

The multifunction device 10 has multiple functions including the printing function, the copying function, the fax transmission function, and the scanning function. As shown in FIG. 1, the multifunction device 10 includes a recording unit 11, a reading unit 12, an operation unit 13, a display unit 14, a communication unit 15, a storage unit 16 and a control unit 17 with one or more computer readable media having computer readable instructions stored thereon that when executed by a processor cause a processor to perform particular steps according to the computer readable instructions. The recording unit 11 operates to form images on a recording medium in accordance with a command from the control unit 17. The recording unit 11 functions as a printer using, for example, a laser transfer scheme or an ink-jet scheme.

The reading unit 12 reads originals when one of the copying function, the fax transmission function and the scanning function is used. Specifically, the reading unit 12 reads an image formed on a recording medium by using an imaging device such as a CCD (charge coupled device) in accordance with a command from the control unit 17, and sends the image obtained by the reading operation to the control unit 17.

Figure 2:
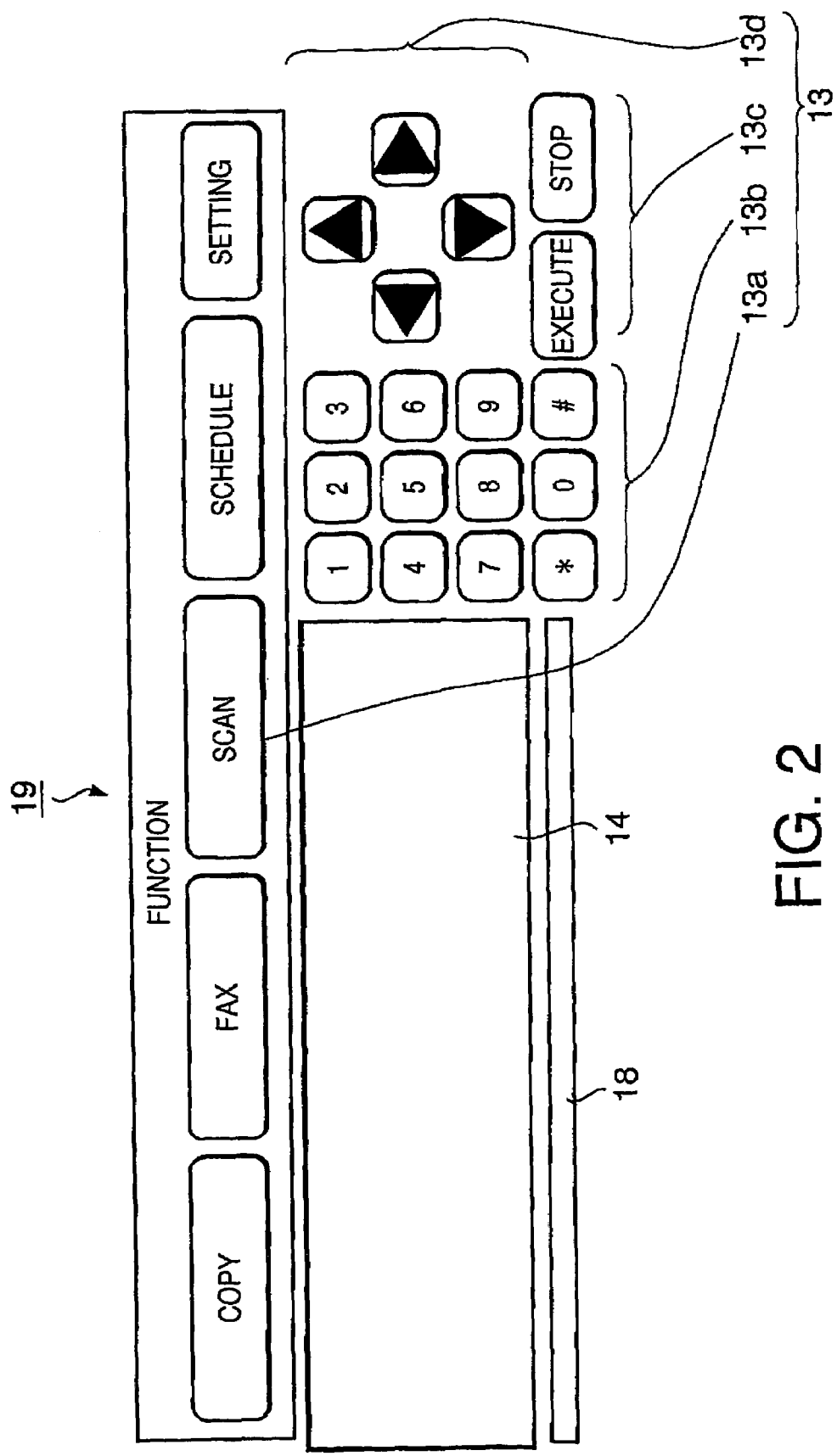
FIG. 2 schematically shows an operation panel of a multi-function device in the information-retrieval device.

The operation unit 13 is used by a user to input various types of commands to the multifunction device 10. As described later, the operation unit 13 is also used to input personal information and schedule information to the multifunction device 10. As shown in FIG. 2, the operation unit 13 includes function keys 13a, a numeric keypad 13b, "Execute" and "Stop" keys 13c, and cursor control keys 13d. The function keys 13a includes a "Copy" key, a "Fax" key and a "Scan" key which are pressed by the user to execute the copying function, the fax transmission function and the scanning function, respectively. The function key 13a further include a "Schedule" key which is used to register the schedule information, to browse the registered schedule information, and to browse search results provided by the information-retrieval server 20. The function keys 13a further include a "Set" key which is used to perform a setting operation and to perform user registration for registering personal information for the multifunction device 20.

The operation unit 13 may be configured by mechanical keys or a touch panel formed integrally with a display panel.

The display unit 14 displays various types of information provided by the control unit 17. The display unit 14 may include a liquid crystal display or an organic electroluminescence display. As shown in FIG. 2, by the operation unit 13 and the display unit 14, an operation panel 19 is configured. The operation panel 19 further includes an indication lamp 18 for indicating the presence/absence of information to be notified to the user.

The communication unit 15 is used to communicate with devices connected to the network 40. The network 40 may be one of a LAN (local area network), a WAN (wide area network, for example, the Internet), and a PSTN (public switch telephone network), or a combination of such networks.

The storage unit 16 stores various types of information including the search result as well as schedule information and personal information inputted by the user. Such information is stored for each of users. The storage unit 16 may be configured by a magnetic storage device, an optical disc drive or a semiconductor storage device (e.g., a flash memory).

The information-retrieval server 20, which may be constituted by a computer, operates to communicate with devices connected to the network 40. The information-retrieval server 20 receives user information and schedule information of a user from the multifunction device 10, and search for service information and another user's schedule information which match with the received schedule information. Then, the information-retrieval server 20 generates data of the search result using the searched service information, and provides the search result to the multifunction device 10 to which the user is registered.

The service information server 30, which may be constituted by a computer, includes a storage device in which various types of service information is stored. The service information server 30 is capable of communicating with devices connected to the network 40.

The service information stored in the service information server 30 is transmitted to the service information server 30 in advance from servers (e.g., Web servers) owned by various providers (including travel, railroad companies, air carriers, hotels, amusement establishments, and gyms) through the network 40. Alternatively or additionally, the service information may be directly inputted by an operator to the service information server 30 using an operation unit of the service information server 30. The service information is stored in the service information server 30 in an appropriate format which enables the information-retrieval server to effectively retrieve required information from the service information server 30.

Hereafter, formats of records of the schedule information, the personal information, the service information and the search result will be explained with reference to FIGS. 3 to 6.

FIG. 3 illustrates a record of a piece of schedule information which is information regarding a schedule of a user. Such a piece of schedule information is stored in the multifunction device 10 for each of the users registered in the multifunction device. As shown in FIG. 3, the schedule information (the record) includes items regarding an event to which a user is involved. Specifically, the schedule information includes fields of a "start date" and an "end date" of an event, the "event type" as a type of an event, a "place", "permission/inhibition" of publication, a "partner", "comments", and a "search result" which are arranged in the record sequentially.

As shown in FIG. 3, in the fields "start date" and the "end data", a start date and an end date of an event are stored, respectively. In the "event type" field, information as to whether the event relates to a business event or a private event is stored. In the "place" field, a place (e.g., a country, province, city, address, place name) where the event takes place is stored. In the "permission/inhibition" field, information as to whether or not publication of the schedule information for a searching operation (which will be described later) is permitted is stored. This information may be stored using a word "permission" or "inhibition". In the "partner" field, the name of a partner is stored. The "partner" field may not be necessarily assigned data (i.e., the "partner" field may be assigned space data).

In the "comments" field, comments about the event are included. The "comments" field may not be necessarily assigned data (i.e., the "comments" field may be assigned space data). In the "search result" field, link information designates search results stored in other records.

As described above, the user is allowed to designate one of the two event types. Therefore, when the user inputs the schedule information, the user selects one of the two event types and inputs a word "business" or "private" to the "type" field. The schedule information may be configured such that a "conference", "seminar" or "vacation" can be designated as the event type in the "type" field.

FIG. 4A illustrates a record of a piece of personal information which is information regarding a schedule of a user. Such a piece of personal information is stored in the multifunction device 10 for each of the users registered in the multifunction device 10. As shown in FIG. 4A, the record of personal information includes fields including a "name" field, a "password" field, an "address" field, an "interesting business keyword" field, an "interesting private keyword" field, an "interesting business partner" field, an "interesting private partner" field, a "color of indication lamp" field, an "automatic printing" field, and an "automatic transferring" field. The "interesting business partner" field and "interesting private partner" field represents information regarding a human connection of a user. Detailed explanation of each field is represented in FIG. 4A.

In the name field, a name for identifying an individual in the system is included. In the password field, a password for user authentication is included. In the address field, the address of the user is included. The information of the address field may be used to locate a user's location when the schedule of the user is not registered.

Since the "event type" includes two event types (i.e., a business event or personal event), the personal information includes private and business information with regard to the interesting keyword and the interesting partner.

FIG. 4B is an explanatory illustration of a record of the "interesting business or private partner" field shown in FIG. 4A. The "interesting business/private partner" field includes a "name" field and a "range of a place" field. The explanation of each record is represented in FIG. 4B.

In the name field, a name of an interesting partner for identifying an individual in the system is included. In the "range of a place" field, a range regarding a place (e.g., "City") used in a searching operation searching for another user's schedule is included FIG. 5 is illustrates a record of a piece of service information which is information regarding a service of a provider. Such a piece of service information is stored in the multifunction device 10 for each of the users registered in the multifunction device 10. As shown in FIG. 5, the service information includes a "start date" field, an "end date" field, an "event type" field, a "place" field, a "keyword" field, an "execution program address" field, a "title" field, and a "category" field.

In the fields "start date" and the "end data", a start date and an end date of a service are stored, respectively. In the "event type" field, information as to whether the service relates to a business service or a private service is stored. In the "place" field, a place (e.g., a country, province, city, address, place name) where the event of the service takes place is stored. In the keyword field, a list of keywords regarding the service provided by a provider is included. In the execution program address field, an address of a program to be executed if the service of this service information is searched and selected. The output of the program is information to be notified to the user.

In the title field, a title of the service is included. In the category field, a category of the service is included.

FIG. 6 illustrates a record of a search result which is generated when the information-retrieval sever 20 executes a searching operation and obtains the service information and the schedule information as a result of the searching operation. Such a piece of service information is stored in the multifunction device 10 for each of the users registered in the multifunction device 10.

As shown in FIG. 6, the search result includes a "start date" field, an "end date" field, a "title" field, an "execution program" field, a "category" field, and a "status" field. In the start date and the end date fields, a start date and an end date of the service are included, respectively. In the title field, a title of information to be notified to a user, a title of the service, or a comment from another user (e.g., an appointment) is included. In the execution program field, a program to be executed when the searched service is selected is included. Further, in the execution program field, a definition regarding the display of text on the display unit, an interface of buttons or data inputs, information transformation, data storing, and data transmission to a server are included.

In the category field, a category of the service is included. If the search result relates to the schedule of another user, a human connection may be included in the category field. In the status field, a status such as "to be read", "already read" or "to be deleted" is included.

Figure 7:
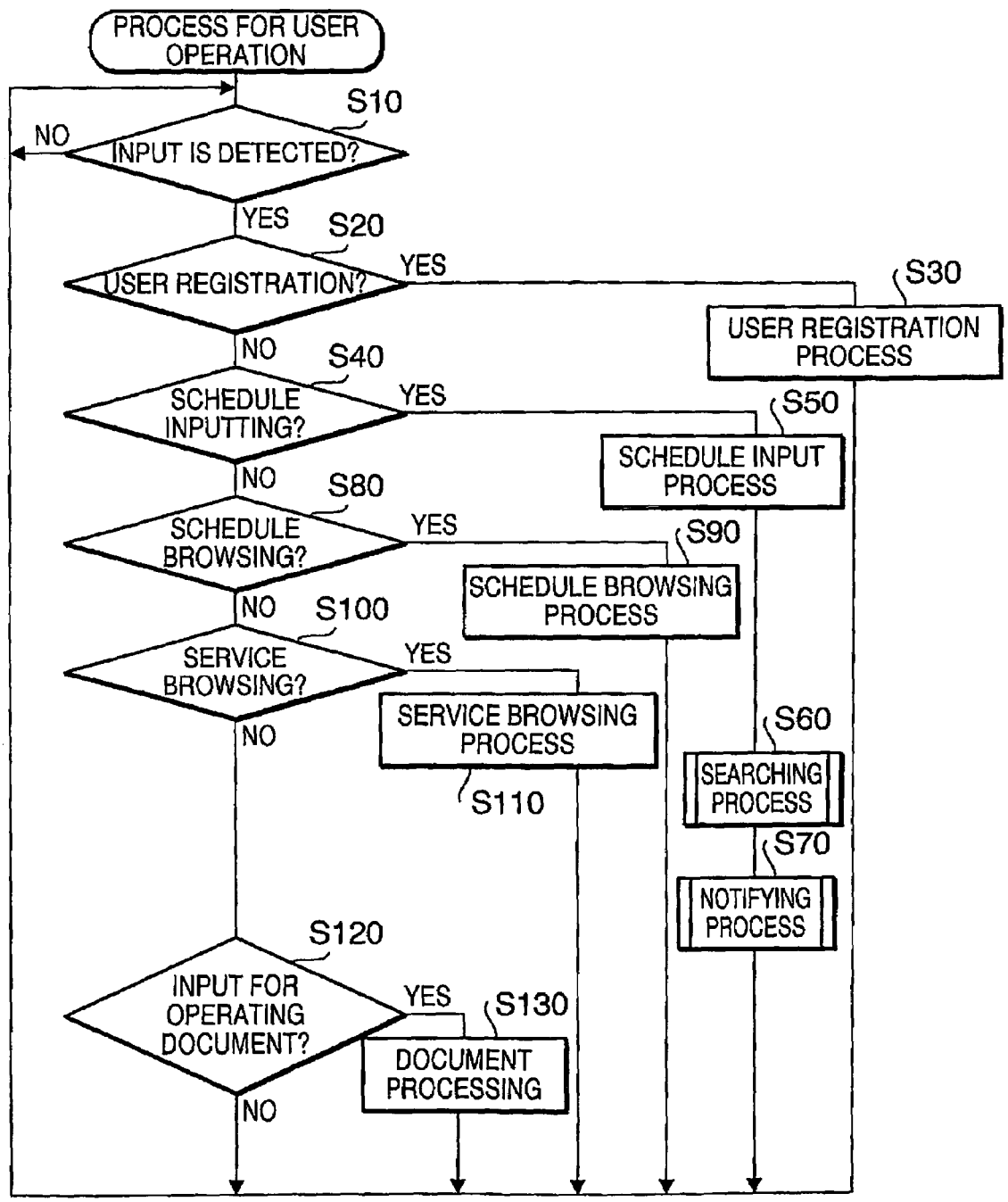
FIG. 7 is a flowchart illustrating a process for processing a user operation.

Hereafter, a process for processing a user operation for operating the multifunction device 20 will be explained with reference to FIG. 7. FIG. 7 is a flowchart illustrating a process for processing the user operation. This process is executed under control of the control unit 17 of the multifunction device 20.

In step S10, the control unit 17 waits until a command is inputted by the user by use of the operation unit 13 (S10:NO). If the input detected (S10:YES), control proceeds to step S20 where the control unit 17 judges whether the inputted command is a command for executing the user registration. If the command is the user registration (S20:YES), control proceeds to step S30 where a user registration process is executed. For example, if the "Set" key on the operation unit 13 is pressed, the control unit 17 judges that the command for executing the user registration is inputted. In step S30, information inputted by the user through an inputting screen displayed on the display unit 14 is stored in the storage unit 16 in the form of a record of personal information shown in FIG. 4.

Then, control returns to step S10. The process of user registration of step S30 will be explained in detail later.

If the inputted command is not the command for executing the user registration (S20:NO), control proceeds to step S40. In step S40, the control unit 17 judges whether the inputted command is a schedule input command for inputting a schedule. For example, if the "Schedule" key on the operation unit 13 is pressed and a predetermined operation is performed, the control unit 17 judges that the schedule input command is inputted. If the schedule command is inputted (S40:YES), control proceeds to step S50 where a schedule input process is executed.

In step S50, information inputted by the user through an inputting screen displayed on the display unit 14 is stored in the storage unit 16 in the form of a record of the schedule information shown in FIG. 3. Then, control returns to step S60. The schedule input process of step S50 will be explained in detail later. In the schedule input process of step S50, the user is allowed to update the schedule information as well as newly generate schedule information.

In step S60, a searching process is executed. In the searching process, the schedule information which was newly inputted or updated in step S50 and predetermined data contained in personal information of the user who inputted or updated the schedule information in step S50 is transmitted to the information-retrieval server 20. Then, the information-retrieval server 20 searches for service information matching the user's schedule contained in the received schedule information and for another user's schedule information matching the user's schedule contained in the received schedule information.

Next, the information-retrieval server 20 generates the search result (see FIG. 6) using the searched information and transmits the search result to the multifunction device 10 in which the user to be notified of the search result is registered. The multifunction device 10 stores the received search result in the search result field of the schedule information (see FIG. 3) matching the received search result. Control proceeds to step S70 where a notifying process is executed. The searching process of step S60 will be explained in detail later.

In step S70, the search result is notified to the user if the search result was obtained in step S60. Specifically, in step S70, the search result is notified to the user in accordance with the data designated in the "color of indication lamp" field, the "automatic printing" field and the "automatic transferring" field. The control then returns to step S10. The notifying process of step S70 will be explained in detail later.

If it is judged in step S40 that the inputted command is not the schedule input command (S40:NO), control proceeds to step S80. In step S80, the control unit 17 judges whether the inputted command is a command for browsing a schedule. If the inputted command is the command for browsing the schedule (S80: YES), control proceeds to step S90 where a schedule browsing process is executed.

In step S90, the control unit 17 operates to allow a user to input a date and to display data in the user's schedule information corresponding to the inputted date on the display unit 14. The user is able to manage her schedule by checking her required schedule information by inputting a date. After the user browses her schedule in step S90, control returns to step S10. The schedule browsing process of step S90 will be explained in detail later.

If it is judged in step S80 that the inputted command is not the command for browsing the schedule (S80: NO), control proceeds to step S100. In step S100, the control unit 17 judges whether the inputted command is a command for browsing services. If the command for browsing services is inputted (S100:YES), control proceeds to step S110 where a service browsing process is executed. For example, if the "Schedule" key is inputted and a predetermined user operation is performed, the control unit 17 judges that the command for browsing services is inputted.

In step S110, a list of titles of searched services is displayed on the display unit 14. If a desired title is selected from the list by the user, a program designated in the "execution program" field in the search result (see FIG. 6) corresponding to the selected title is initiated, and various types of processes for allowing the user to enjoy the selected service are also executed in accordance with the program being executed. The service browsing process of step S110 will be explained in detail later.

If it is judged in step S100 that the inputted command is not the command for browsing services (S100: NO), control proceeds to step S120. In step S120, the control unit 17 judges whether the detected input is an input for operating a document. If the detected input is the input for a document operation (S120:YES), control proceeds to step S130 where a document processing process is executed. For example, if one of the "Copy" key, "Fax" key and "Scan" key is pressed, the control unit 17 judges that the detected input is the input for a document operation.

In step S130, the multifunction device 10 executes the function corresponding to the detected input. Specifically, the multifunction device 10 executes one of the copying operation in which image data of an original obtained by the reading unit 12 is recorded on a sheet by the recording unit 11, the fax operation in which image data of an original obtained by the reading unit 12 is converted to data complying with a facsimile standard and the converted data is transmitted to another facsimile device through the network 40, and the scanning operation in which image data of an original obtained by the reading unit 12 is transmitted to a device (e.g., a personal computer).

The multifunction device 10 has another operation mode in which the multifunction device 10 receives printing data or facsimile data from one of devices connected to the network 40 and records the received data on a sheet using the recording unit 11.

Figure 8:
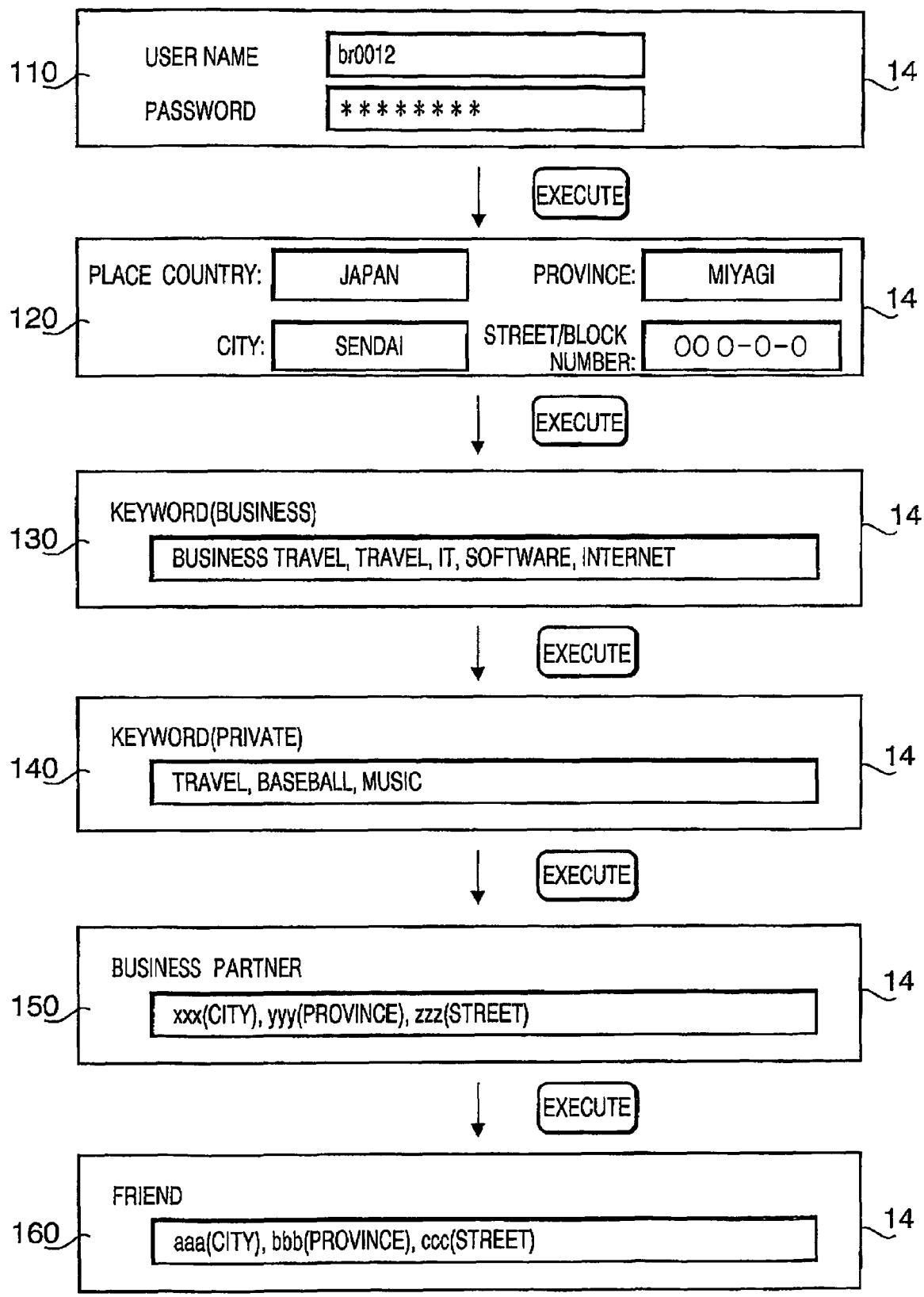
FIG. 8 illustrates an example of transition of a screen displayed on a display unit of the multifunction device during a registration process.

Hereafter, the user registration process executed in step S30 of FIG. 7 will be explained with reference to FIG. 8. FIG. 8 illustrates an example of the transition of a screen displayed on the display unit 14 during the registration process.

The user registration process is initiated when the user presses, for example, the "Set" key of the function keys 13a. As shown in FIG. 8, the control unit 17 displays a screen 110 so as to allow a user to register a user name (corresponding to the "name" field of the personal information) to be used to identify the user on the system, and a password (corresponding to the "password" field of the personal information) used for user authentication. The user operates the operation unit 13 to enter data into each field of the screen 110 and then presses the "Execution" key (13c) to fix the inputted data.

Next, the control unit 17 displays a screen 120 so as to allow the user to input a place (corresponding to the "address" field of the personal information). Through use of the screen 120, the user inputs a country, province, city, street, and block number, and fixes the inputted data.

Next, the control unit 17 displays a screen 130 so as to allow the user to input a keyword (corresponding to the "interesting business keyword" field of the personal information) concerning the business. Through use of the screen 130, the user inputs a keyword regarding the activity of the business (e.g., "business travel" or "travel"), or a keyword regarding the type of business (e.g., "IT" or "Software"). The keyword inputted through use of the screen 130 is used in the searching process if the type of the schedule designated in the schedule information is "business".

Next, the control unit 17 displays a screen 140 so as to allow the user to input a keyword (corresponding to the "interesting private keyword" field of the personal information). Through use of the screen 140, the user inputs a keyword, for example, "travel", "baseball", and "music", regarding the matter of concern to the user. The keyword inputted through use of the screen 140 is used in the searching process if the type of the schedule designated in the schedule information is "private".

Although in the above mentioned explanation the user inputs letters of the keyword ("business travel", "travel", "IT", "baseball" or "music") into the corresponding field of the screen 130 or 140, an inputting scheme may be adopted in which a list of keywords which are previously stored in the storage unit 16 in a database is displayed on the display unit 14 and the user is allowed to select a keyword from the displayed list of keywords.

Next, the control unit 17 displays a screen 150 so as to allow the user to input a business partner (corresponding to the "interesting business partner" field of the personal information). For example, through use of the screen 150, the user registers a name of a person of a business connection or a client. The business partner inputted through use of the screen 150 is used in the searching process if the type of the schedule designated in the schedule information is "business".

Next, the control unit 17 displays a screen 160 so as to allow the user to input a friend (corresponding to the "interesting private partner" field of the personal information). For example, through use of the screen 160, the user registers a name of the user's friend whom the user is not able to meet at frequently intervals since the friend lives in a faraway region. The private partner inputted through use of the screen 160 is used in the searching process if the type of the schedule designated in the schedule information is "private".

When the user inputs the business or private partner through use of the screen 150 or 160, the user may input a range of places to be used in the checking operation for checking a user's schedule against another user's schedule. In the case where the "City" is designated as the "range of the places", the result of the checking operation is "consistent" (which indicates that two pieces of schedule information of two users are consistent with each other) only if data of items from the country to the city in a user's place field coincides with data from the country to the city in another user's place field.

In each of the screens 150 and 160, a city, a province and a street are designated as the "place". Although, in the above mentioned explanation of the screens 150 and 160, the user inputs letters of a name of an interesting partner into the corresponding field of the screen 150 or 160, an inputting scheme may be adopted in which a list of all of the user names registered in the multifunction device 10 which are previously stored in the storage unit 16 in a database is displayed on the display unit 14 and the user is allowed to select one of the displayed interesting partners.

The information inputted by the user through use of the screens shown in FIG. 8 is stored in the storage unit 16 as the private information as shown in FIG. 4A. After the information has been inputted through use of all of the screens shown in FIG. 8, the user registration process terminates.

Hereafter, the schedule input process executed in step S50 of FIG. 7 will be explained with reference to FIG. 9. FIG. 9 illustrates an example of the transition of a screen displayed on the display unit 14 during the schedule input process.

The schedule input process is initiated when the user presses, for example, the "Schedule" key of the function keys 13a and the user logs in to the system by inputting a name and a password. When the schedule input process is initiated, the control unit 17 first displays a calendar screen 210 including a calendar on the display unit 14. If the user moves a cursor 210a to a "Register" button using the cursor keys 13d and presses the "Execute" key, the control unit 17 displays a screen 220 to start an inputting process for inputting a schedule.

Through use of the screen 220, the user is allowed to input a start date of a schedule (corresponding to the "start date" field of the schedule information) and an end date of the schedule (corresponding to the "end date" field of the schedule information) using the operation unit 13.

Next, the control unit 17 displays a screen 230 so as to allow the user to input the type of event (e.g. one of "business" or "private").

Next, the control unit 17 displays a screen 240 so as to allow the user to input the place where the event takes place. Specifically, the user inputs a country, province, city, and place name in the respective fields on the screen 240.

Next, the control unit 17 displays a screen 250 so as to allow the user to input a partner (e.g., a person with whom the user will meet in the event).

Next, the control unit 17 displays a screen 260 so as to allow the user to input comments regarding the event. The screen 260 may be used to write a memo about the event.

Next, the control unit 17 displays a screen 270 so as to allow the user to designate whether to permit the publication of the user's schedule. If the publication of the user's schedule is permitted, the user's schedule information is used in the searching process in which the information-retrieval server 20 searches for another user's schedule information matching the user's schedule information. That is, only schedule information of which "permission/inhibition" field is assigned the "permission" status is targeted for the searching operation. If the user decides to permit the publication of the schedule, the user presses "YES" button on the screen 270. If the user decides to inhibit the publication of the schedule, the user presses "NO" button on the screen 270.

The information thus inputted through user of the screens shown in FIG. 9 is stored in the storage unit 16 in the form shown in FIG. 3. After the information has been inputted through the screens shown in FIG. 9, the schedule input process terminates.

Hereafter, the registration of service information will be explained with reference to FIG. 10. FIG. 10 illustrates an example of the transition of a screen displayed on the display unit 14 during a registration process of service information.

The service information is inputted by an operator through an inputting screen 300 which is displayed on a display of the service information server 30 or a device (e.g., a Web server) managed by a provider. As shown in FIG. 10, the inputting screen 300 includes inputting fields for entering date information (corresponding to the "start date" and "end date" fields of the service information shown in FIG. 5), an event type, a place, a keyword, a program address (corresponding to the "execution program address" field of the service information), a title, and a category.

If a service (or an article for sale) offered by a provider can be enjoyed in both of the business scene and the private scene, the provider is allowed to assign "non-type" to the "event type" filed on the inputting screen 300. If the "non-type" is assigned to the "event type" field, the service information in which the "non-type" is designated is targeted for the searching process for searching for service information matching the user's schedule regardless of whether the "event type" designated in the user's schedule information is "business" or "private".

If the service to be offered to the user relates to booking of public transport, the provider may input "travel", "transport", "booking" and "business journey" to the keyword field on the inputting screen 300. If the service to be offered to the user relates to booking of accommodation facilities, the provider may input "travel", "hotel", and "booking" to the keyword field on the inputting screen 300.

The program address inputted to the program address field on the inputting screen 300 is an address (e.g., a uniform resource locator) from which a program is obtained or executed if it is judged in the searching process that the service information matches the user's schedule information. For example, a destination of a link designated in the program address field on the screen 300 is a program stored in a device (e.g., a Web server) managed by the provider.

The title is a brief description of the service. If pieces of service information are searched in the searching process, data in each category field is used for categorizing the pieces of service information.

The information inputted by the user through the inputting screen 300 is stored in the service information server 30 in a form shown in FIG. 5.

Figure 11:
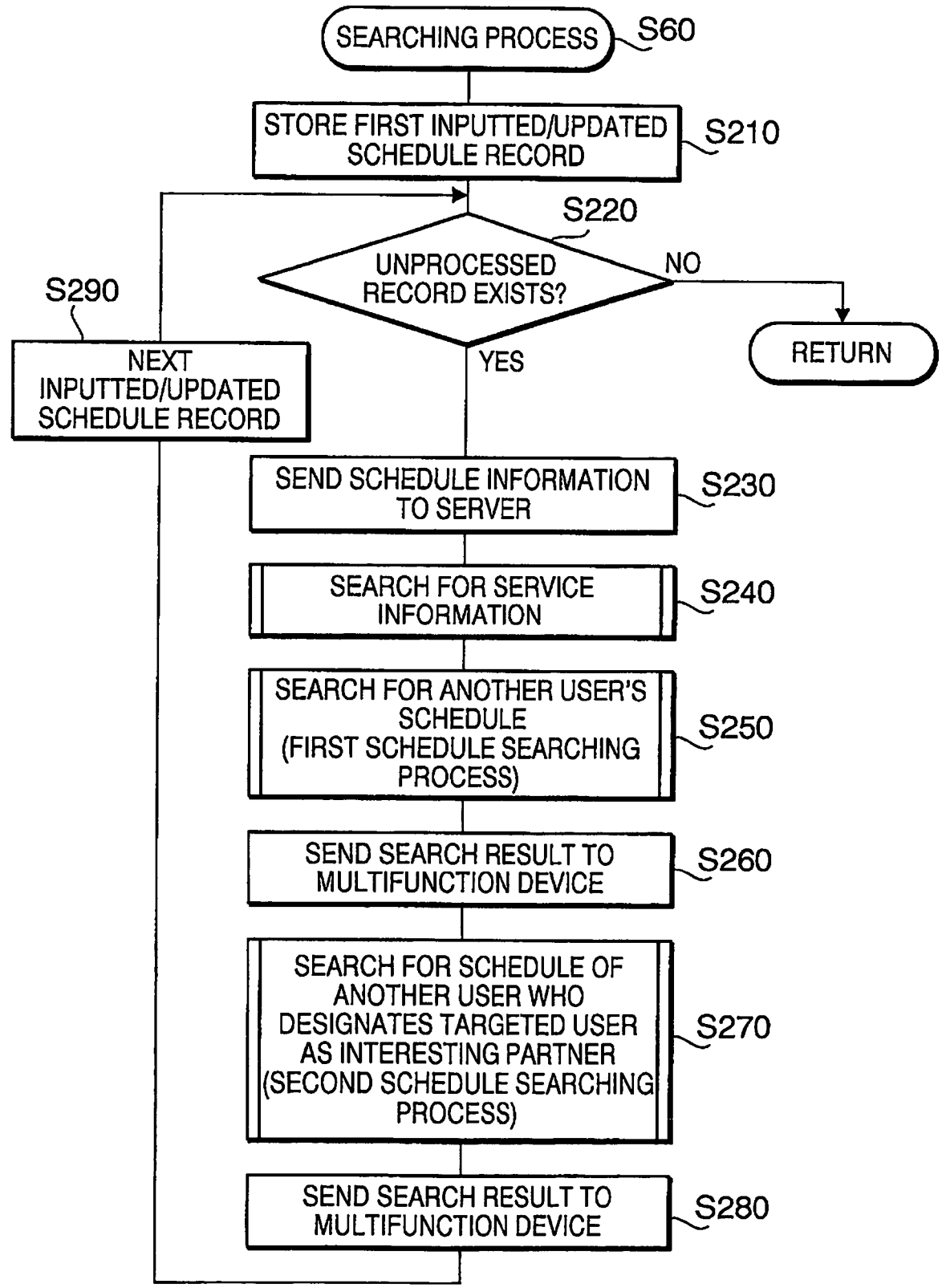
FIG. 11 is a flowchart illustrating a searching process.

Hereafter, the searching process executed in step S60 of FIG. 7 will be explained with reference to FIGS. 11 to 15. FIG. 11 is a flowchart illustrating the searching process (S60) which is executed to process the schedule information which is inputted or updated by the user in step S50. The searching process explained below is executed under control of the control unit 17 of the multifunction device 10.

As shown in FIG. 11, firstly, the control unit 17 stores the record of the first one of all of the pieces of schedule information inputted or updated by the user as a target record to be processed (S210). Then, the control unit 17 judges whether an unprocessed record exists (S220). If the unprocessed record exists (S220:YES), the control unit transmits the target record and data (e.g., a keyword, and an interesting partner) contained in the personal information of the user to which the target record (schedule information) belongs to the information-retrieval server 20 (S230).

After the information-retrieval server 20 receives the target record (hereafter, referred to as an inputted/updated schedule information record) and the data (e.g., a keyword, and an interesting partner) contained in the personal information, the information-retrieval server 20 searches for a record of the service information (hereafter, referred to as a service information record) matching the received inputted/updated schedule information record (S240).

Figure 12:
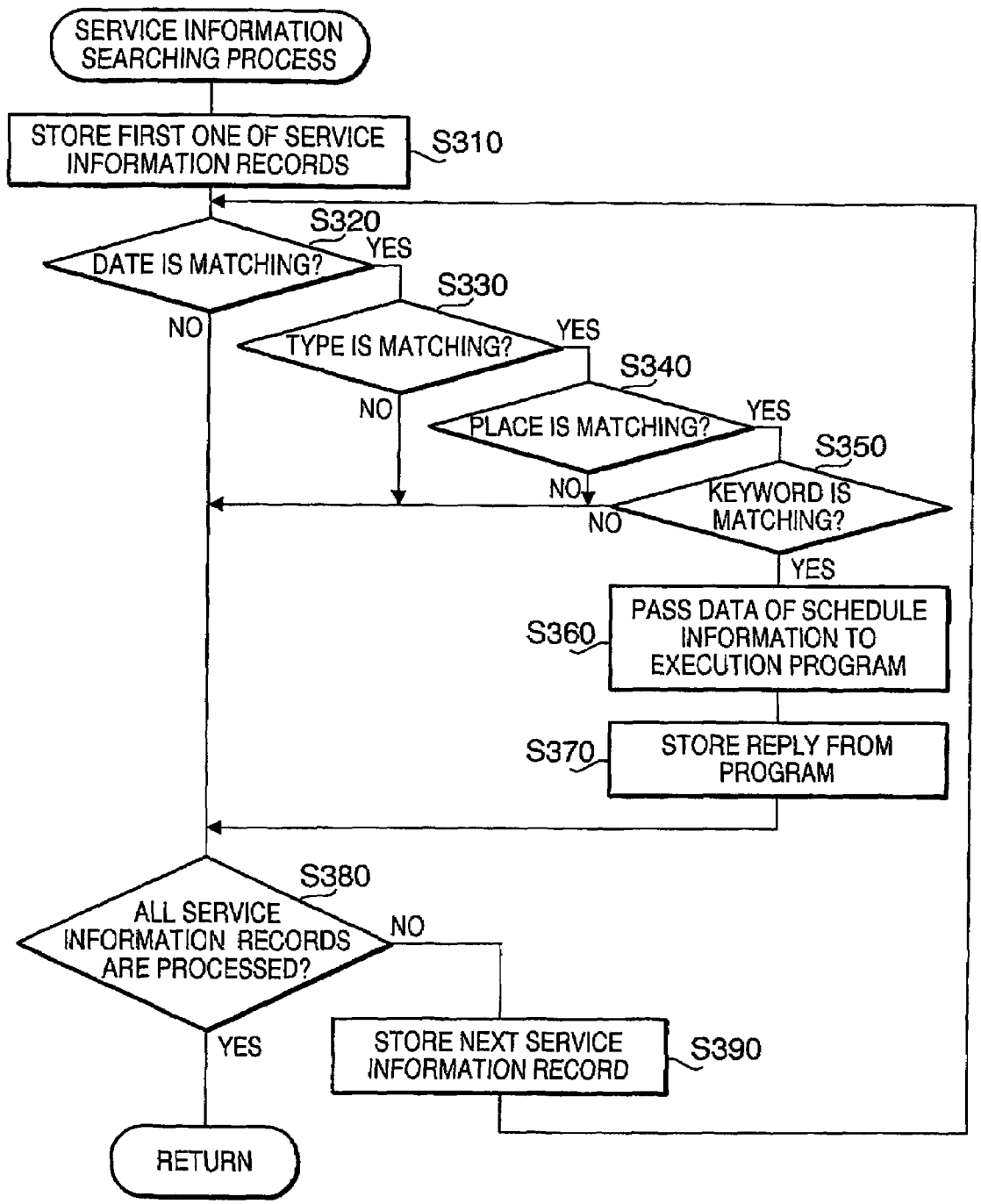
FIG. 12 is a flowchart illustrating a service information searching process.

FIG. 12 is a flowchart illustrating in detail a service information searching process executed in step S240. This process is executed under control of a CPU of the information-retrieval server 20. Firstly, the information-retrieval server 20 stores the record of the first one of all of the service information records stored in each of the service information servers 30 (S310).

Next, the information-retrieval server 20 judges whether the date, the event type, the place, and the keyword of the received inputted/updated schedule information record match with the date, the event type, the place, and the keyword of the currently targeted service information record, respectively (S320, S330, S340, S350).

An explanation on how the inputted data is processed in the judgment steps S320, S330, S340 and S350 will be made with regard to personal information, schedule information and the service information respectively shown in FIGS. 8, 9 and 10.

With regard to the judgment step S320, since the time period of the service informant shown in FIG. 10 covers the date in the schedule information shown in FIG. 9, the information-retrieval server 20 judges that these dates matches each other (i.e., the judgment result of step S320 is "YES").

With regard to the judgment step S330, since the event type of the schedule information is "business" and the event type of the service information is "non-type", the information-retrieval server 20 judges that these event types match with each other (i.e., the judgment result of step S330 is "YES"). With regard to the judgment step S340, since the place of the schedule information is "Japan, Aichi, Nagoya" and the place of the service information is also "Japan, Aichi, Nagoya", the information-retrieval server 20 judges that these places match with each other (i.e., the judgment result of step S340 is "YES").

With regard to the judgment step S350, since the keywords "travel" and "business journey" contained in the personal information shown in FIG. 8 match with the keywords "travel" and "business journey" contained in the service information shown in FIG. 10, the information-retrieval server 20 judges that the keyword data of the personal information and the keyword data of the service information match with each other (i.e., the judgment result of step S350 is "YES").

If all of the judgment results of steps S320, S333, S340 and S350 are "YES", the information-retrieval server 20 judges that the currently targeted service information record matches the inputted/updated schedule information record, and control proceeds to step S360. If at least one of the results of the steps S320, S333, S340 and S350 is "NO", the information-retrieval server 20 judges that the currently targeted service information record does not match with the inputted/updated schedule information record, and control proceeds to step S380 without processing step S360 and S370.

In step S360, the information-retrieval server 20 accesses a device designated in the execution program address, in which a link to a program (on another device) to be executed is designated, contained in the currently targeted service information record to initiate the program of the linked device. In this case, the information-retrieval server 20 also sends the information including the date, the place, and the event type to the linked device so that this information is used by the program of the linked device. If the linked device is a Web server on the Internet, a technique of CGI (Common Gateway Interface) may used to initiate the program of the linked device.

After the program of the linked device is initiated, the information-retrieval server 20 receives outputs of the program and stores the outputs in a memory of the information-retrieval server 20 (S370). Then, control proceeds to step S380.

As described later, the outputs of the program of the linked device are sent from the information-retrieval server 20 to the multifunction device 10 (in step S260) in a form of the search result shown in FIG. 6. In the execution program field of the search result, a program to be executed when the user browses information corresponding to the search result is designated. The program designated in the search result contains definitions regarding information conversion, data storing, and data communication with a device (e.g., a server) managed by the provider.

As a definition of the data communication with a server, a location of the server or a URL including the server's location to which the schedule information such as a date, place and event type is added as arguments may be used.

In step S370, if the information-retrieval server 20 judges that information beneficial to the user can not be provided to the user (for example, because a room can not be booked on a date designated in the user's schedule), the information-retrieval server 20 may operate not to store the outputs of the program of the linked server. In this case, unnecessary information is prevented from being sent to the user, and thereby usability of the system 1 is further enhanced.

In step S380, the information-retrieval server 20 judges whether all of the service information records stored in the service information servers 30 are processed. If all of the service information records are not processed (S380:NO), control proceeds to step S390. In step S390, the information-retrieval server 20 stores the next service information record as a target to be processed. Then, control returns to step S320. If all of the service information records stored in the service information servers 30 are processed (S380:YES), the service information service process terminates.

Figure 13:
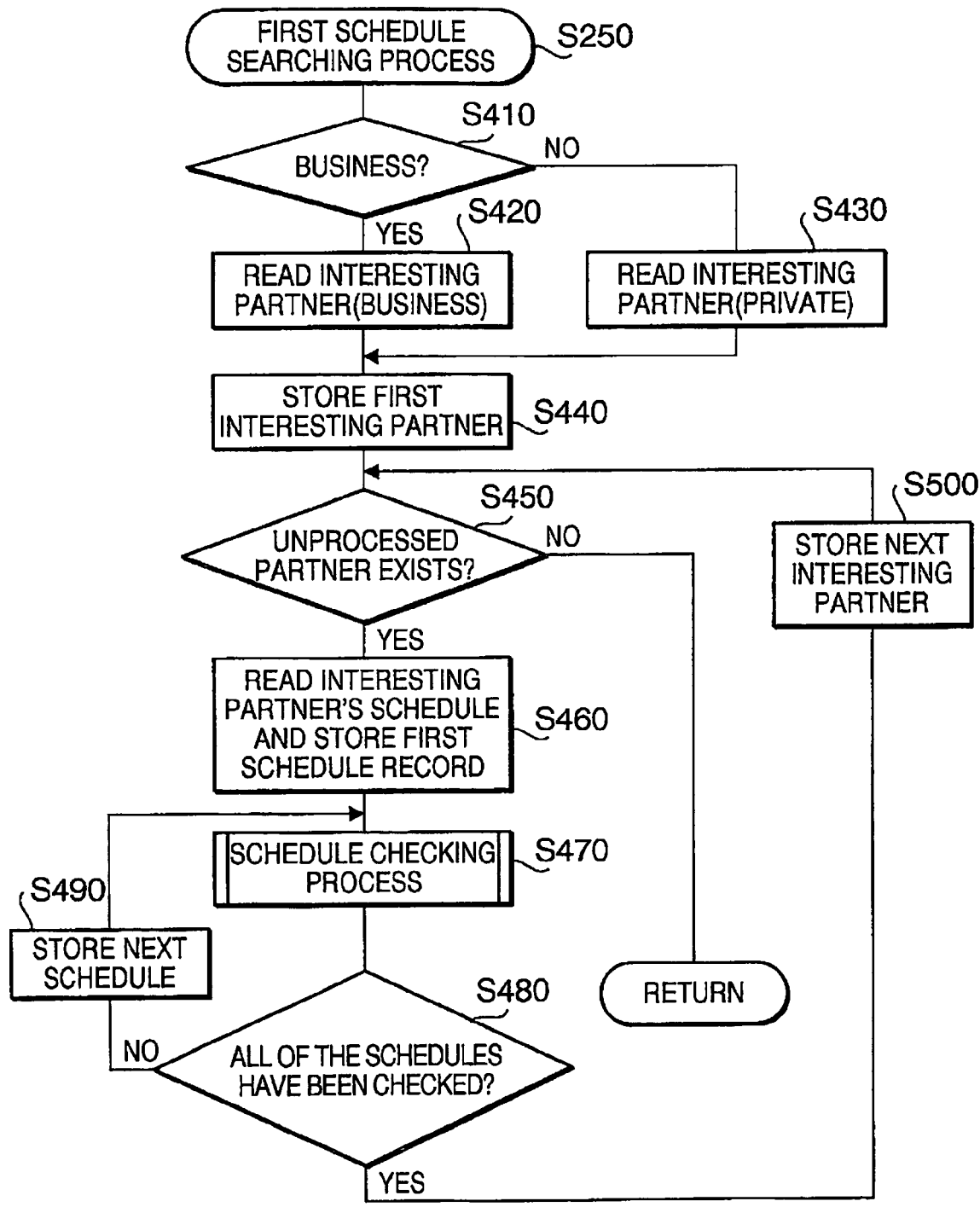
FIG. 13 is a flowchart illustrating a first schedule searching process.

As shown in FIG. 11, after the service information service process is finished, control proceeds to step S250. In step S250, a first schedule searching process is executed. In this process, information-retrieval server 20 searches for another user's schedule record (schedule information) matching the currently targeted inputted/updated schedule information record. FIG. 13 is a flowchart illustrating the first schedule searching process.

As shown in FIG. 13, in step S410, the information-retrieval server 20 judges whether the event type of the inputted/updated schedule information record is "business" or "private". If the event type is "private" 'S410:YES), the information-retrieval server 20 obtains the interesting business partner from the user's personal information (S420). If the event type is not "business" (S410:NO), the interesting private partner of the user is obtained from the user's personal information (S430).

Next, the information-retrieval server 20 stores the first one of the interesting partners obtained in step S420 or S430 as a target to be processed (S440). In step S450, the information-retrieval server 20 judges whether an unprocessed interesting partner exists. If the unprocessed interesting partner exists (S450:YES), control proceeds to step S460. In step S460, the information-retrieval server 20 obtains the schedule record and keywords belonging to the currently targeted interesting partner from the multifunction device 10 in which the interesting partner is registered, and stores the first one of the records of the obtained schedule information. Then, control proceeds to step S470.

Figure 14:
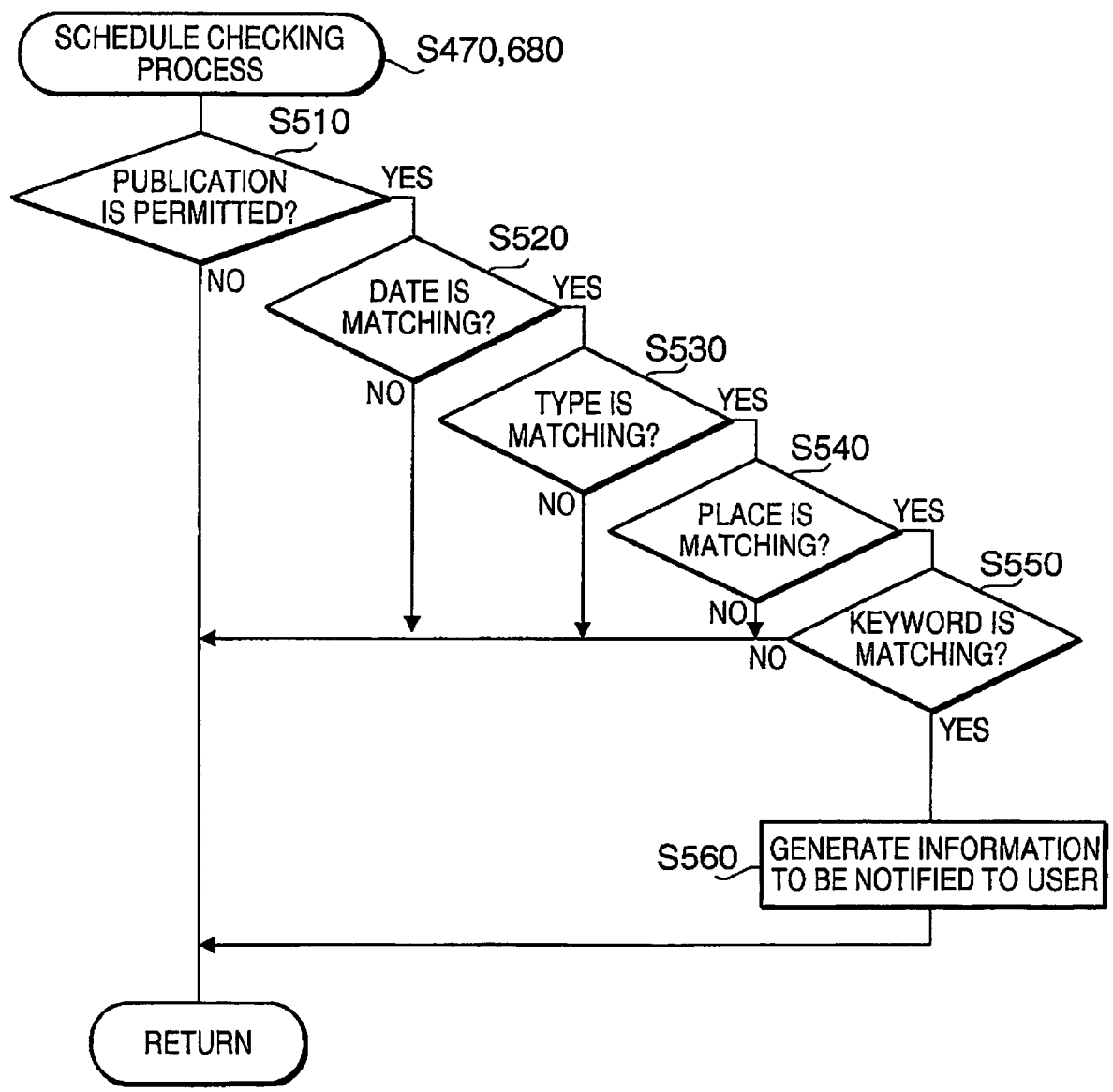
FIG. 14 is a flowchart illustrating a schedule checking process.

FIG. 14 is a flowchart illustrating a schedule checking process executed in step S470. In this process, the information-retrieval server 20 operates to check the currently targeted inputted/updated schedule information record with another user's schedule record.

As shown in FIG. 14, in step S510, the information-retrieval server 20 judges whether the publication of the schedule record of the targeted interesting partner is permitted. If the publication of the schedule record of the targeted interesting partner is permitted (S510:YES), control proceeds to step S520. If the publication of the schedule record of the targeted interesting partner is inhibited (S510:NO), the schedule checking process terminates.

The process of step S510 may be configured such that only if both of the publication of the inputted/updated schedule information record and the publication of the interesting partner's schedule information are permitted, the judgment result becomes "YES".

The information-retrieval server 20 judges whether the date, the event type, the place, and the keyword of the inputted/updated schedule information record match with the date, the event type, the place, and the keyword of the interesting user's service record, respectively (S520, S530, S540, S550). In step S550, keywords relating to the event type of the inputted/updated schedule information record may be selected and the selected keywords may be used for the checking.

If all of the results of the judgment steps of S520, S530, S540 and S550 are "YES", the information-retrieval server 20 judges that the currently targeted schedule information record of the interesting partner matches the inputted/updated schedule information record, and control proceeds to step S560. If at least one of the results of the judgment steps of S520, S530, S540 and S550 is "NO", the information-retrieval server 20 judges that the interesting partner's schedule information record does not match with the inputted/updated schedule information record, and the schedule checking process terminates.

In step S560, a search result (search result record) is generated based on the interesting partner's schedule information record and the inputted/updated schedule information record in a form shown in FIG. 6, and the generated search result is stored in memory. Then, the schedule checking process terminates.

A title to be contained in the search result generated in the first schedule searching process may be a message indicating that the user's schedule matches the partner's schedule or a reply to the interesting partner's request for making an appointment. A category to be contained in the search result may be "human connection".

Referring now to FIG. 13, after the first schedule searching process is finished, control proceeds to step S480. In step S480, the information-retrieval server 20 judges whether all of the schedule records of the interesting partner are processed. If it is judged that all of the schedule records of the interesting partner have not been processed (S480:NO), control proceeds to step S490 where the information-retrieval server 20 stores the next schedule record of the interesting partner. Then, control returns to step S470 to process the next schedule record.

If it is judged that all of the schedule records of the interesting partner have been processed (S480: YES), control proceeds to step S500. In step S500, information-retrieval server 20 stores the next interesting partner of the interesting partners designated in the user's private information. Then, control returns to step S450.

If it is judged that an unprocessed interesting partner does not exist (S450:NO), the first schedule searching process terminates.

Referring now to FIG. 11, after the first schedule searching process is finished, control proceeds to step S260. In step S260, the search results stored in the memory of the information-retrieval server 20 in step S240 and S250 are sent to the multifunction device 10 in which the user of the inputted/updated schedule information record is registered. Then, control proceeds to step S270.

In step S270, the information-retrieval server 20 may operate not to transmit the search result obtained in the service information searching process if the search results relate to, for example, booking of a room of a hotel and the search result indicates that the booking of a room of a hotel is finished unsuccessfully.

Figure 15:
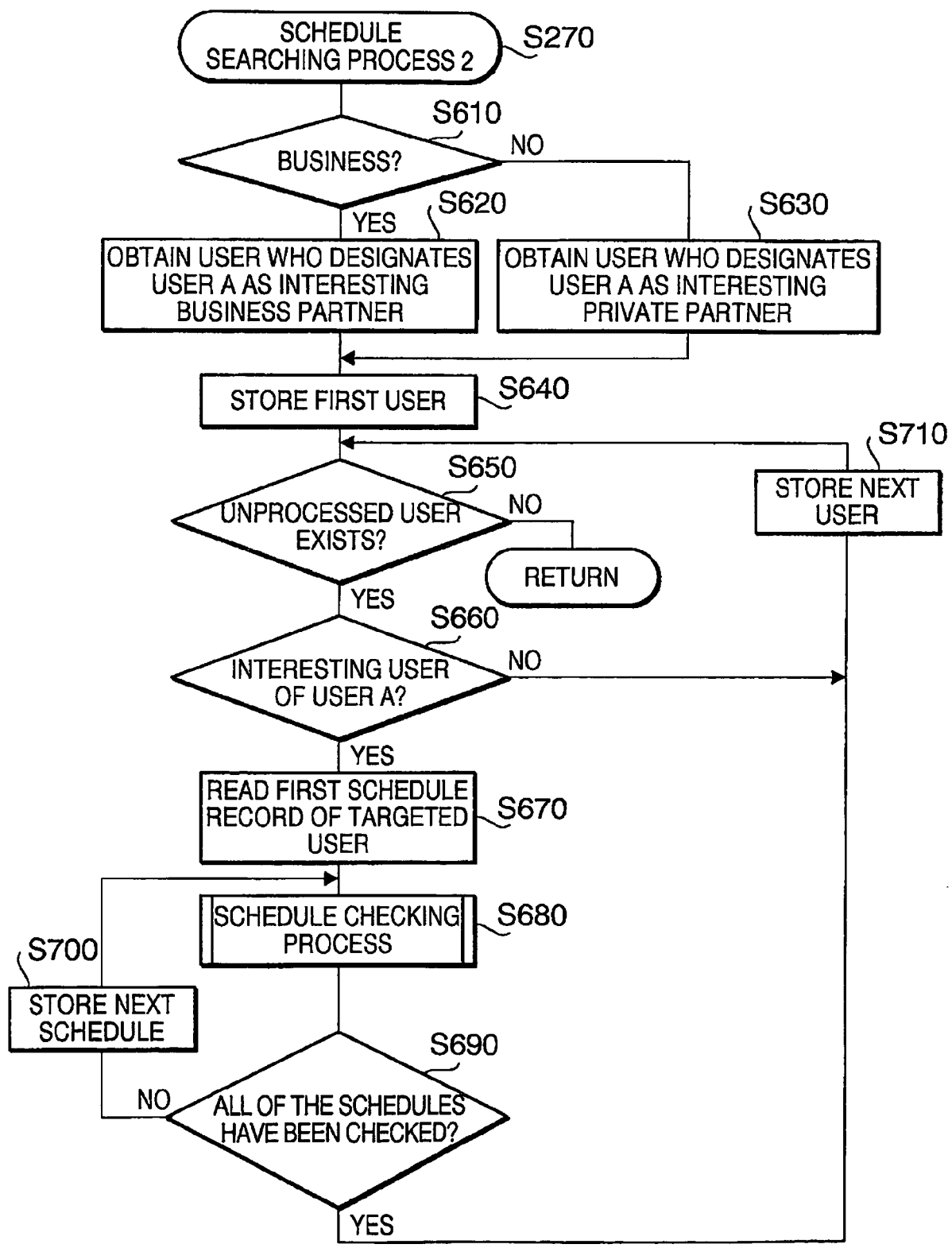
FIG. 15 is a flowchart illustrating a second schedule searching process.

After the step S260 is finished, control proceeds to step S270 where a second schedule searching process is executed. FIG. 15 is a flowchart illustrating the second schedule searching process. In this process, schedule information belonging to another user who designates the user of the currently targeted inputted/updated schedule information record as the interesting business or private partner. In the following explanation, the user of the currently targeted inputted/updated schedule information record is referred to as user A.

As shown in FIG. 15, the information-retrieval server 20 judges whether the event type contained in the inputted/updated schedule information record is "business". If the event type is "business" (S610:YES), control proceeds to step S620. In step S620, information-retrieval server 20 obtains users who designated user A as the interesting business partner in their respective personal records (S620). If the event type is "private" (S610:NO), control proceeds to step S630. In step S630, information-retrieval server 20 obtains users who designated user A as the interesting private partner in their respective personal records (S630).

Next, in step S640, the information-retrieval server 20 stores the first one of the users obtained in step S620 or step S630 as a target to be processed. In step S650, information-retrieval server 20 judges whether an unprocessed user exists. If an unprocessed user exists (S650: YES), control proceeds to step S660 where information-retrieval server 20 judges whether the currently targeted user is equal to an interesting partner for the user A. If the targeted user is the interesting partner for the user A (S660: YES), control proceeds to step S670. If the targeted user is not the interesting partner for the user A (S660: NO), control proceeds to step S710.

If it is judged in step S650 that an unprocessed user does not exist (S650:NO), the second schedule searching process terminates.

In step S670, the schedule record and the keyword of the targeted user is obtained from the multifunction device 10 in which the targeted user is registered, and the information-retrieval server 20 stores the first one of the schedule records as a target to be processed. Then, control proceeds to step S680 where the schedule checking process is executed.

In the schedule checking process step S680 is executed as follows. First, the information-retrieval server 20 judges whether the publication of the inputted/updated schedule information record is permitted (S10). If the publication of the inputted/updated schedule information record is not permitted (S510: YES), control proceeds to step S520. If the publication of the inputted/updated schedule information record is permitted (S510: NO), the schedule checking process terminates. The process of step S510 may be configured such that the result of judgment becomes "YES" only if both of the publication of the inputted/updated schedule information record and the publication of the schedule record of the targeted user is permitted.

Since the process from the step S520 of the schedule checking process is the same as that explained above with reference to FIG. 14, explanation thereof will not be repeated.

In step S690, the information-retrieval server 20 judges whether all of the schedule records of the targeted partner have been processed. If all of the schedule records of the targeted user have not been processed (S690: NO), the information-retrieval server 20 stores a next one of the schedule records of the targeted user as a target record to be processed. If all of the schedule records of the targeted user have been processed (S690: YES), the information-retrieval server 20 stores a next user as a target user to be processed (S710). Then, control returns to step S650.

Referring now to FIG. 11, after the second schedule searching process is finished, control proceeds to step S280. In step S280, the information-retrieval server 20 sends the search result obtained in step S270 to the multifunction device 10 in which the user (judged to match with the inputted/updated schedule information record of the user A in step S270) is registered. Then, the control unit 17 of the multifunction device 10 stores the next inputted/updated schedule information record as a target record to be processed (S290). Then, control proceeds to step S220.

If it is judged in step S220 that the unprocessed record does not exist (S220:NO), the searching process terminates.

The multifunction device 10 receives the search result from the information-retrieval server 20, and stores the received search result in the search result field of the schedule record corresponding to the received search result.

Figure 16:
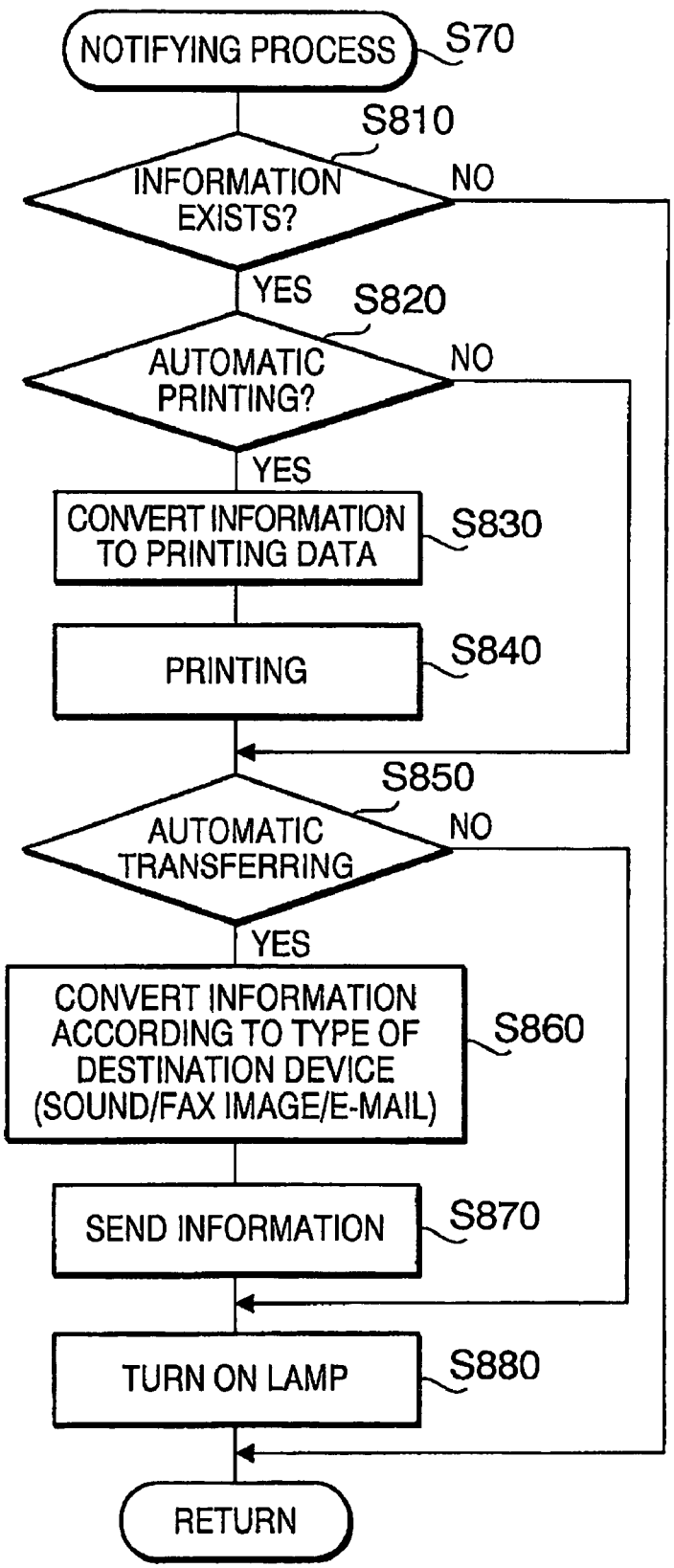
FIG. 16 is a flowchart illustrating a notifying process.

Hereafter, the notifying process executed in step S70 of FIG. 7 will be explained with reference to FIG. 16. FIG. 16 is a flowchart illustrating the notifying process (S70). As shown in FIG. 16, in step S810, the control unit 17 judges whether the control unit 17 (the multifunction device 10) has received the search result from the information-retrieval server 20. If so (S810:YES), control proceeds to step S820. If the multifunction device 10 has not received the search result (S810: NO), the notifying process terminates.

In step S820, the control unit 17 judges whether the setting of the "automatic printing" of the personal information of the user to be notified of the search result (i.e., the user corresponding to the schedule record containing the search result) is ON or OFF. If the automatic printing is ON (S820:YES), the control unit converts the received search result to printing data (S830). Then, the control unit 17 operates to print out the printing data on a sheet using the recording unit 11 (S840). Then, control proceeds to step S850.

In step S850, the control unit 17 judges whether the setting of the "automatic transferring" of the personal information of the user to be notified of the search result is ON or OFF. If the "automatic transferring" is ON (S850:YES), control proceeds to step S860. In step S860, the control unit 17 converts the received search result to data (e.g., sound data, facsimile data, or email data) in accordance with the type of a destination device. Then, the control unit 17 sends the converted data to the destination device through the communication unit 15 (S870). If the "automatic transferring" is OFF (S850:NO), control proceeds to step S880 without processing steps S860 and S870.

In step S880, the control unit 17 turns on the indication lamp 18 (see FIG. 2) in a color designated in the "color of indication lamp" field of the personal information of the user. Then, the notifying process terminates.

Figure 17:
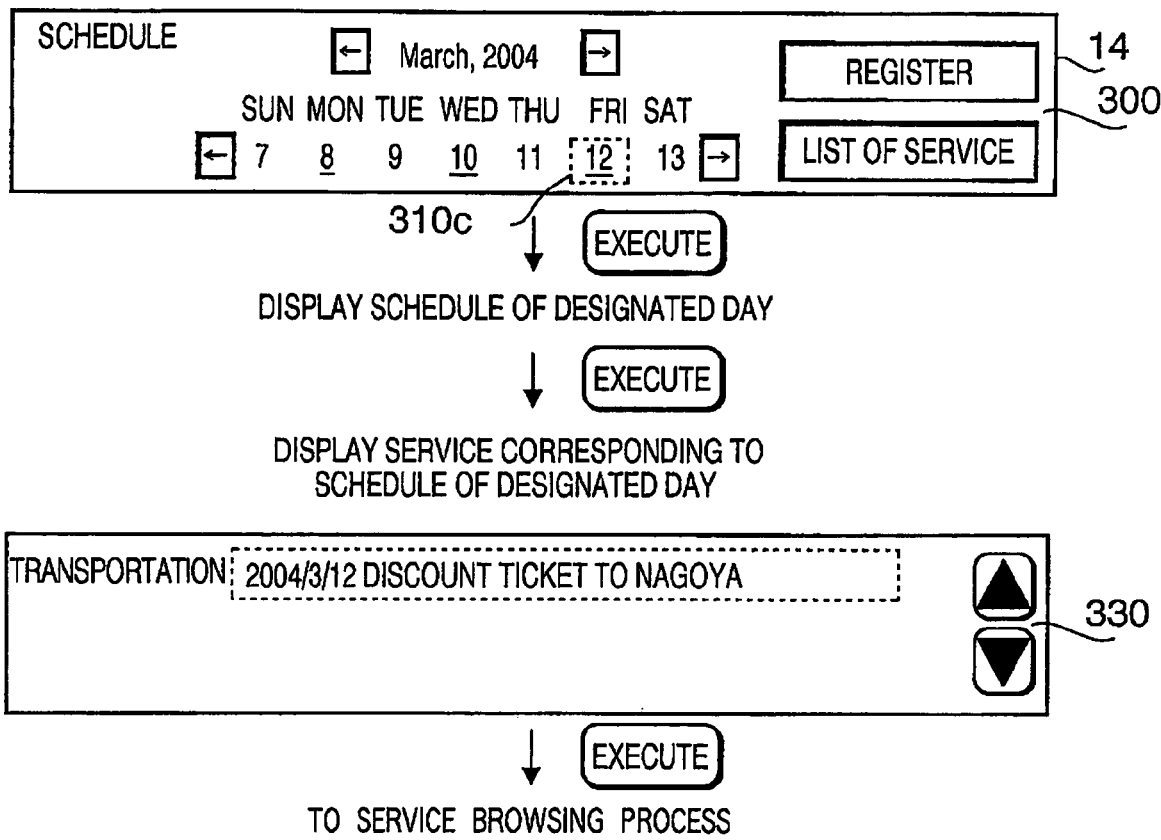
FIG. 17 illustrates an example of transition of a screen displayed on the display unit of the multifunction device during a schedule browsing process.

Hereafter, the schedule browsing process executed in step S90 of FIG. 7 will be explained with reference to FIG. 17. FIG. 17 illustrates an example of the transition of a screen displayed on the display unit 14 during the schedule browsing process which is executed under control of the control unit 17 of the multifunction device 10.

As shown in FIG. 17, if the user presses the "Schedule" key of the function keys 13*a* and the user logs in the system by inputting a user name and a password to the system, a calendar screen 300 is displayed on the display unit 14. In the calendar screen 300, a calendar representing dates on a weekly basis is included. The dates displayed on the screen 300 can be scrolled to display a next or previous week by moving a cursor 310*c* to a position of one of arrow symbols on the calendar and then pressing the "Execute" button. In the calendar, the date corresponding to the user's schedule is underlined.

By moving the cursor to the date about which the user wants to browse the schedule and then pressing the "Execute" key, the schedule information about the selected date is displayed on the display unit 14. In this case, the date, the event type, the place, the partner and the comments are displayed sequentially in this order.

With regard to the date of the schedule information containing the search result regarding the service information or another user's schedule, representation other than an underline (e.g., representation by boldface) may be adopted so that the visibility is enhanced.

If the service information matching the selected schedule exists (i.e., the search result provided by the information-retrieval server 20 is contained in the search result field of the selected schedule information), the title of the search result is displayed (see a screen 330). If the user selects the title on the screen 330 and then presses the "Execute" button, the service browsing process is executed.

Hereafter, the service browsing process executed in step S110 of FIG. 7 will be explained with reference to FIGS. 18 and 19. Each of FIGS. 18 and 19 illustrates an example of the transition of a screen displayed on the display unit 14 during the service browsing process which is executed in step S110 of FIG. 7 under control of the control unit 17 of the multifunction device 10.

Figure 18:
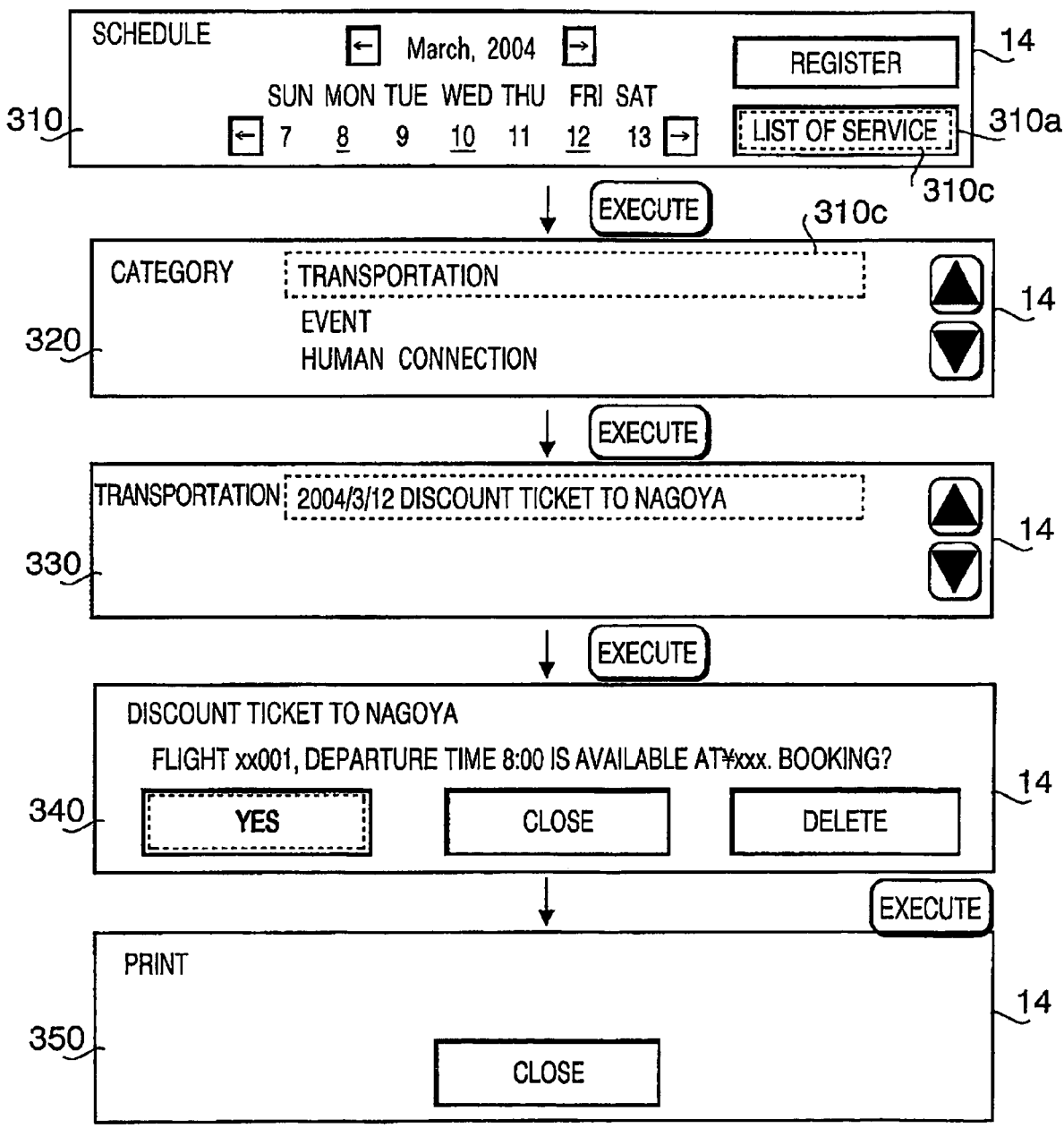
FIGS. 18 and 19 illustrate an example of transition of a screen displayed on the display unit of the multifunction device during a schedule browsing process.
Figure 19:
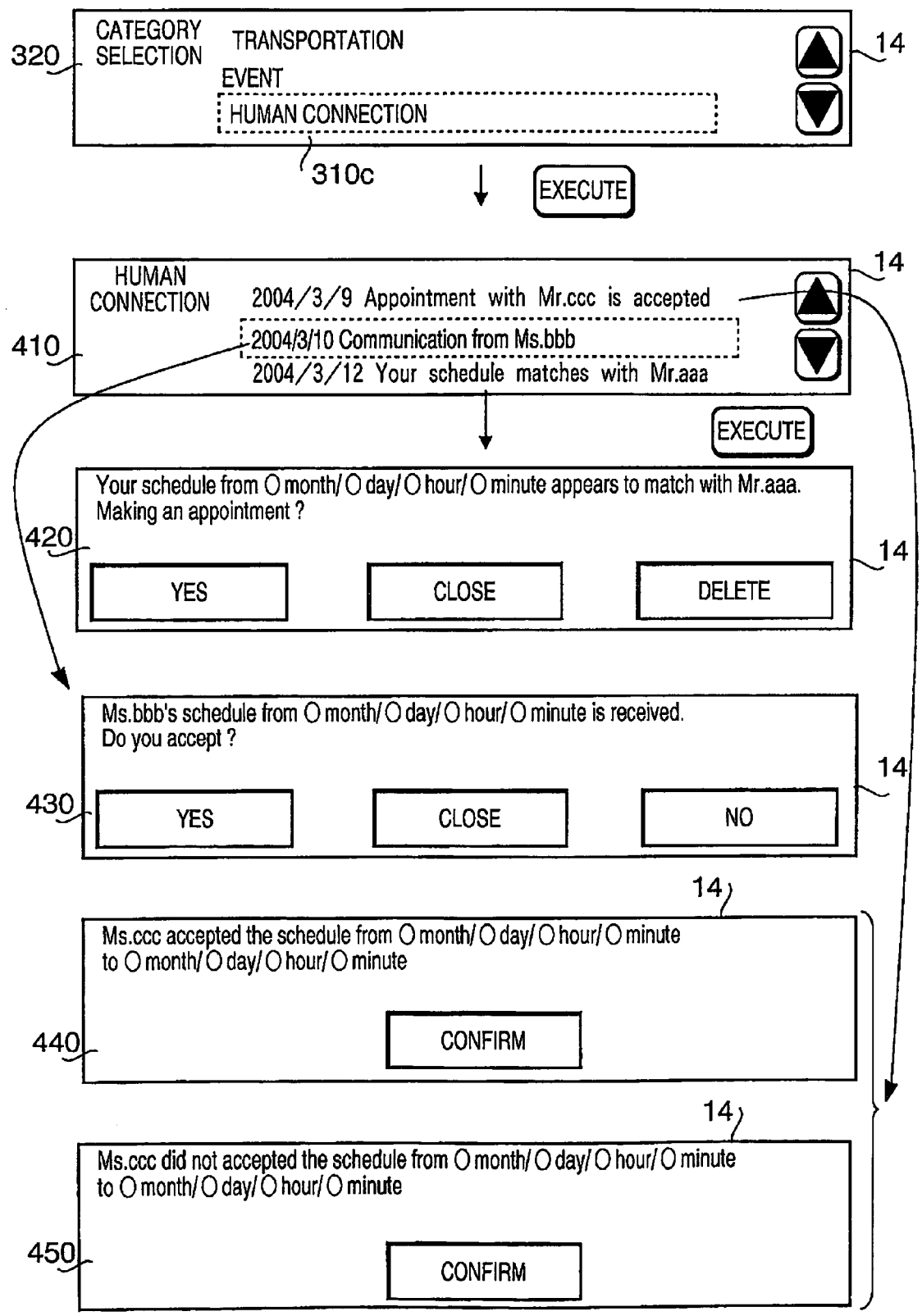

As shown in FIG. 18, if the user presses the "Schedule" key of the function keys 13*a* and the user logs in the system by inputting a user name and a password to the system, a calendar screen 310 is displayed on the display unit 14. If the user moves a cursor to a service list icon 310*a* by operating the cursor control keys 13*d* and then presses the "Execute" key, a category selection screen 320 is displayed.

If search results are provided by the information-retrieval server 20, the search results are categorized by the category designated in the category field. In the screen 320, categories obtained from the search results are displayed. If the user selects one of the categories and then presses the "Execute" button, a list of titles of the services belonging to the selected category is displayed on a screen 330. In the example of the screen 320, "transportation" is selected.

If the user selects a desirable title from titles displayed on the screen 330 and the presses the "Execute" button, the program designated in the search result corresponding to the selected title is initiated. Then, various processes are executed by the program. For example, as shown in FIG. 18, a screen 340 for allowing the user to book a flight is displayed. If the user selects a "Yes" button on the screen 340, a screen 350 is displayed and a certification of the booking is printed by the recording unit 11.

In the "human connection" category, the search results relate to the schedule searching process. Therefore, if the user wants to view the schedules of interesting partners, the user selects the "human connection" category. If the user selects the "human connection" category on the screen 320 (see FIG. 19), the search result relating to the schedule searching process, and a list of titles relating to a process of making an appointment performed by the program designated in the search result are displayed (see a screen 410).

In the screen 410, a title "My schedule matches a schedule of a user "aaa" on 2004/3/12" is displayed if the user's schedule matches the schedule of the user "aaa". If the user selects this title, a process for making an appointment to see the user "aaa" is initiated (see a screen 420). If the user selects a "YES" button on the screen 420, information regarding the process for making an appointment is sent to the user "aaa".

In the screen 410, a title indicating that a message from a user "bbb" on 2004/3/10 is displayed if information regarding a request for making an appointment sent by the user "bbb" is received. If the user selects this title, a process for replying to the request sent by the user "bbb" is initiated (see screen 430). If the user selects a "YES" or "No" button on the screen 430, information regarding the reply to the request sent to the user "bbb".

In the screen 410, a title indicating that an appointment is accepted by the user "ccc" on 2004/3/9 is displayed if the multifunction device 10 receives, from the user "ccc", information regarding a reply to a request for making an appointment with the user "ccc". If the user selects this title, a process for browsing the reply to the request for making an appointment is executed.

Although the present invention has been described in considerable detail with reference to certain illustrative embodiments thereof, other embodiments are possible.

In the above mentioned illustrative embodiment, the above mentioned various processes (including the user registration process, the searching process, the notifying process and the browsing process) are implemented on separate devices (i.e., the multifunction device, the information-retrieval server 20, and the service information server 30) in the information-retrieval system 1. However, such processes may be implemented on a single device.

In the service information searching process (FIG. 12) and the schedule checking process (FIG. 14), it is judged that the inputted/updated schedule information record matches the target record only if all of the results of the judgment steps regarding the date, event type, place and keywords are "YES". As an alternative to such a configuration, it may be judged that the inputted/updated schedule information record matches the target record if the judgment result of the keywords is "YES" and at least one of the results of the judgment steps of the date, event type and place is "YES". In this case, the number of judgment steps to be passed may be predetermined.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiment. It will also be appreciated and understood that modifications may be made without departing from the true spirit and scope of the present invention. The description is thus to be regarded as illustrative instead of restrictive.

What is claimed is:

1. An information-retrieval system comprising:
memory having computer executable components stored thereon; and
one or more computers containing processors configured to execute the components, the components including:
a schedule storing system configured to store schedule information regarding a schedule of a user, wherein the schedule information includes a date, a type and a place of the schedule;
a service information storing system configured to store a plurality of pieces of service information respectively corresponding to a plurality of types of services, wherein each of the plurality of pieces of service information includes a date, a type and a place of a corresponding service;
a searching system configured to search the plurality of pieces of service information for at least one piece of matched information of the plurality of pieces of service information matching the schedule information of the user by comparing the date, the type and the place of the schedule with the date, the type and the place of each of the plurality of types of services, respectively;
a personal information storing system configured to store personal information of the user, wherein at least one keyword is related to the personal information;
each of the plurality of pieces of service information includes a keyword regarding a corresponding service;
when at least one of the date, the type and the place of the schedule matches one of the plurality of pieces of service information, and the at least one keyword of the personal information matches the keyword of the one of the plurality of pieces of service information, the searching system is configured to treat the one of the plurality of pieces of service information as the at least one piece of matched information: and
a registering system configured to register the schedule information of the user,
wherein the information retrieval system retrieves one or more pieces of service information matching the user's schedule information by registering the user's schedule information
wherein the components further include an outputting system configured to output information obtained based on the at least one piece of matched information,
further comprising an information input and output device including:
computer readable components stored in the memory and executable by the one or more processors; the components including
an inputting system configured to receive a user input of the schedule information;
an information requesting system configured to request the searching system to start a searching operation at a predetermined time;
an information receiving system configured to receive the information outputted by the outputting system;
a received data storing system configured to store the information received by the information receiving system;
an image forming system configured to form an image on a recording medium based on the information stored by the received data storing system; and
a displaying system configured to display an image based on the information stored by the received data storing system.

2. An information-retrieval system, comprising:
memory having computer executable components stored thereon; and
one or more computers containing processors configured to execute the components, the components including:
a schedule storing system configured to store a plurality of pieces of schedule information respectively corresponding to schedules of a plurality of users, wherein the schedule information includes a date, a type and a place of the schedule;
a service information storing system configured to store a plurality of pieces of service information respectively corresponding to a plurality of types of services, each of the plurality of pieces of service information includes a date, a type and a place of a corresponding service;
a searching system configured to search the plurality of pieces of service information for at least a piece of matched information matching one of the plurality of pieces of schedule information by comparing the date, the type and the place of the schedule with the date, the type and the place of each of the plurality of types of services, respectively;
a personal information storing system configured to store personal information of the user, wherein at least one keyword is related to the personal information;

each of the plurality of pieces of service information includes a keyword regarding a corresponding service;

when at least one of the date, the type and the place of the schedule matches one of the plurality of pieces of service information, and the at least one keyword of the personal information matches the keyword of the one of the plurality of pieces of service information, the searching system is configured to treat the one of the plurality of pieces of service information as the at least one piece of matched information, and a registering system configured to register the schedule information of the user, wherein the information retrieval system retrieves one or more pieces of service information matching a first user's schedule information in response to registering the first user's schedule information, and wherein the information retrieval system retrieves at least a second user's schedule information matching the first user's schedule information by registering the first user's schedule information without the first user having to identify the at least a second user.

3. An information-retrieval system, comprising:

memory having computer executable components stored thereon; and one or more computers containing processors configured to execute the components, the components including:

a schedule storing system configured to store a plurality of pieces of schedule information respectively corresponding to schedules of a plurality of users;

a personal information storing system configured to store a plurality of pieces of personal information respectively corresponding to the plurality of users, a searching system configured to search the plurality of pieces of schedule information to obtain at least one piece of matched information of the plurality of pieces of schedule information matching a first one of the plurality of pieces of schedule information corresponding to a first user of the plurality of users; and a registering system configured to register one of the plurality of pieces of schedule information inputted by the user through use of an inputting system in the schedule information storing system;

wherein the information retrieval system retrieves at least a second user's schedule information matching the first user's schedule information by registering the first user's schedule information without the first user having to identify the at least a second user, further wherein:

each of the plurality of pieces of personal information includes human connection information specifying at least one related user; and the searching system is configured to search a part of the plurality of pieces of schedule information corresponding to the at least one related user specified in the human connection information of the first user to obtain the at least one piece of matched information matching the first one of the plurality of pieces of schedule information belonging to the first user, further wherein:

each of the plurality of pieces of schedule information includes a date, a type and a place of a corresponding schedule;

at least one keyword is related to each of the plurality of pieces of personal information; and when at least one of the date, the type and the place of the first one of the plurality of pieces of schedule information belonging to the first user matches the second one of the plurality of pieces of schedule information, and the at least one keyword of the first one of the plurality of pieces of schedule information matches the at least one keyword of the second one of the plurality of pieces of schedule information, then the searching system is configured to treat the second one as the at least one piece of matched information.

4. The information-retrieval system according to claim 3, wherein the components further include an outputting system configured to output information obtained based on the at least one piece of matched information.

5. The information-retrieval system according to claim 4, wherein:

when at least one of the date, the type and the place of the first one of the plurality of pieces of schedule information belonging to the first user matches a second one of the plurality of pieces of schedule information, the searching system is configured to treat the second one as the at least one piece of matched information.

6. The information-retrieval system according to claim 5, wherein:

the at least one related user specified in the human connection information is classified according to the type of the corresponding schedule; and the part of the plurality of pieces of schedule information to be searched by the searching system is limited by the at least one related user classified according to the type of the corresponding schedule of the first user.

7. The information-retrieval system according to claim 5, wherein:

the at least one keyword related to each of the plurality of pieces of personal information is classified according to the type of a corresponding one of the plurality of pieces of schedule information;

when at least one of the date, the type and the place of the first one of the plurality of pieces of schedule information belonging to the first user matches the second one of the plurality of pieces of schedule information, and the at least one keyword classified according to the type of the first one of the plurality of pieces of schedule information matches the at least one keyword classified according to the type of the second one of the plurality of pieces of schedule information, then the searching system is configured to treat the second one as the at least one piece of matched information.

8. The information-retrieval system according to claim 3, wherein:

each of the plurality of pieces of schedule information includes publication information defining permission or inhibition of publication thereof; and the searching system is configured to search the plurality of pieces of schedule information having the publication information being defined as permitting the publication to obtain the at least one piece of matched information.

9. An information-retrieval system, comprising:

memory having computer executable components stored thereon: and one or more computers containing processors configured to execute the components, the components including:

a schedule storing system configured to store a plurality of pieces of schedule information respectively corresponding to schedules of a plurality of users:

a personal information storing system configured to store a plurality of pieces of personal information respectively corresponding to the plurality of users, a searching system configured to search the plurality of pieces of schedule information to obtain at least one piece of matched information of the plurality of pieces of schedule information matching a first one of the plurality of pieces of schedule information corresponding to a first user of the plurality of users: and a registering system configured to register one of the plurality of pieces of schedule information inputted by the user through use of an inputting system in the schedule information storing system:

wherein the information retrieval system retrieves at least a second user's schedule information matching the first user's schedule information by registering the first user's schedule information, further wherein:

each of the plurality of pieces of personal information includes human connection information specifying at least one related user: and the searching system is configured to search a part of the plurality of pieces of schedule information corresponding to the at least one related user specified in the human connection information of the first user to obtain the at least one piece of matched information matching the first one of the plurality of pieces of schedule information belonging to the first user.

further wherein:

each of the plurality of pieces of schedule information includes a date, a type and a place of a corresponding schedule;

at least one keyword is related to each of the plurality of pieces of personal information: and when at least one of the date, the type and the place of the first one of the plurality of pieces of schedule information belonging to the first user matches the second one of the plurality of pieces of schedule information, and the at least one keyword of the first one of the plurality of pieces of schedule information matches the at least one keyword of the second one of the plurality of pieces of schedule information, then the searching system is configured to treat the second one as the at least one piece of matched information.

wherein the components further include an outputting system configured to output information obtained based on the at least one piece of matched information, wherein information-retrieval system comprises an information input and output device including:

computer readable components stored in the memory and executable by the one or more processors, the components including an inputting system configured to allow one of the plurality of users to input or update one of the plurality of pieces of schedule information and one of the plurality of pieces of personal information;

the registering system further configured to register one of the plurality of pieces of personal information inputted by the user through use of the inputting system in and the personal information storing system;

an information requesting system configured to request the searching system to start a searching operation at a predetermined time;

an information receiving system configured to receive the information outputted by the outputting system;

a received data storing system configured to store the information received by the information receiving system; an image forming system configured to form an image on a recording medium based on the information stored by the received data storing system; and a displaying system configured to display an image based on the information stored by the received data storing system.

10. The information-retrieval system according to claim 9, wherein the information requesting system requests the searching system to start the searching operation when the one of the plurality of pieces of schedule information is inputted or updated by a corresponding user and the inputted or updated one of the plurality of pieces of schedule information is registered in the schedule information storing system.

11. The information-retrieval system according to claim 9, wherein the information outputted by the outputting system is a notification that the at least one piece of matched information is searched.

12. The information-retrieval system according to claim 9, wherein the received data storing system relates the information received by the information receiving system to a corresponding one of the plurality of pieces of schedule information.

13. The information-retrieval system according to claim 9, wherein:

each of the plurality of personal information includes information as to whether to automatically start an image forming operation; and when first one of the plurality of pieces of personal information corresponding to the first user includes the information indicating that the image forming operation should be executed automatically, the image forming system is configured to form the image automatically.

14. The information-retrieval system according to claim 9, wherein the components of the information input and output device further include a transferring system configured to transfer the information stored by the received data storing system to a destination device.

15. A device used in association with the information-retrieval system including memory having computer executable components stored thereon; and one or more processors configured to execute the components, the components including:

a schedule storing system configured to store a plurality of pieces of schedule information respectively corresponding to schedules of a plurality of users;

a searching system configured to search the plurality of pieces of schedule information to obtain at least one piece of matched information of the plurality of pieces of schedule information matching a first one of the plurality of pieces of schedule information corresponding to a first user of the plurality of users;

an outputting system configured to output information obtained based on the at least one piece of matched information; and a personal information storing system configured to store a plurality of pieces of personal information respectively corresponding to the plurality of users, wherein:

each of the plurality of pieces of personal information includes human connection information specifying at least one related user; and the one or more processors are configured to search a part of the plurality of pieces of schedule information corresponding to the at least one related user specified in the human connection information of the first user to obtain the at least one piece of matched information matching the first one of the plurality of pieces of schedule information belonging to the first user;

further wherein:
each of the plurality of pieces of schedule information includes a date, a type and a place of a corresponding schedule;
at least one keyword is related to each of the plurality of pieces of personal information; and
when at least one of the date, the type and the place of the first one of the plurality of pieces of schedule information belonging to the first user matches the second one of the plurality of pieces of schedule information, and the at least one keyword of the first one of the plurality of pieces of schedule information matches the at least one keyword of the second one of the plurality of pieces of schedule information, then the searching system is configured to treat the second one as the at least one piece of matched information;
the device comprising:
memory storing computer readable components executable by the one or more processors, the components including
an inputting system configured to allow one of the plurality of users to input or update one of the plurality of pieces of schedule information and one of the plurality of pieces of personal information;
an inputted information registering system configured to register one of the plurality of pieces of schedule information and one of the plurality of pieces of personal information inputted by the user through use of the inputting system in the schedule information storing system and the personal information storing system, respectively;
wherein the information retrieval system retrieves at least a second user's schedule information matching the first user's schedule information by registering the first user's schedule information;
an information requesting system configured to request the searching system to start a searching operation at a predetermined time;
an information receiving system configured to receive the information outputted by the outputting system;
a received data storing system configured to store the information received by the information receiving system; an image forming system configured to form an image on a recording medium based on the information stored by the received data storing system; and
a displaying system configured to display an image based on the information stored by the received data storing system.

16. One or more computer readable storage media having computer-readable instructions stored thereon that when executed by a processor cause the processor to perform the steps of:
storing a plurality of pieces of schedule information respectively corresponding to schedules of a plurality of users;
storing a plurality of pieces of personal information respectively corresponding to the plurality of users,
searching the plurality of pieces of schedule information to obtain at least one matched information of the plurality of pieces of schedule information matching a first one of the plurality of pieces of schedule information corresponding to a first user of the plurality of users; and
registering at least one of the plurality of pieces of schedule information;
providing the user with the at least one matched information corresponding to at least a second user's schedule information matching the first user's schedule information by registering the first user's schedule information without the first user having to identify the at least a second user,
wherein:
each of the plurality of pieces of personal information includes human connection information specifying at least one related user; and
the searching system is configured to search a part of the plurality of pieces of schedule information corresponding to the at least one related user specified in the human connection information of the first user to obtain the at least one piece of matched information matching the first one of the plurality of pieces of schedule information belonging to the first user,
further wherein: each of the plurality of pieces of schedule information includes a date, a type and a place of a corresponding schedule;
at least one keyword is related to each of the plurality of pieces of personal information; and
when at least one of the date, the type and the place of the first one of the plurality of pieces of schedule information belonging to the first user matches the second one of the plurality of pieces of schedule information, and the at least one keyword of the first one of the plurality of pieces of schedule information matches the at least one keyword of the second one of the plurality of pieces of schedule information, then the searching system is configured to treat the second one as the at least one piece of matched information.

17. A method of retrieving information, comprising the steps of:
storing a plurality of pieces of schedule information respectively corresponding to schedules of a plurality of users;
storing a plurality of pieces of personal information respectively corresponding to the plurality of users,
searching the plurality of pieces of schedule information to obtain at least one matched information of the plurality of pieces of schedule information matching a first one of the plurality of pieces of schedule information corresponding to a first user of the plurality of users; and
registering at least one of the plurality of pieces of schedule information;
providing the user with the at least one matched information corresponding to at least a second user's schedule information matching the first user's schedule information by registering the first user's schedule information without the first user having to identify the at least a second user,
wherein:
each of the plurality of pieces of personal information includes human connection information specifying at least one related user; and
the searching system is configured to search a part of the plurality of pieces of schedule information corresponding to the at least one related user specified in the human connection information of the first user to obtain the at least one piece of matched information matching the first one of the plurality of pieces of schedule information belonging to the first user,
further wherein:
each of the plurality of pieces of schedule information includes a date, a type and a place of a corresponding schedule;
at least one keyword is related to each of the plurality of pieces of personal information; and when at least one of the date, the type and the place of the first one of the plurality of pieces of schedule information belonging to the first user matches the second one of the plurality of pieces of schedule information, and the at least one keyword of the first one of the plurality of pieces of schedule information matches the at least one keyword of the second one of the plurality of pieces of schedule information, then the searching system is configured to treat the second one as the at least one piece of matched information.

* * * * *

UNITED STATES PATENT AND TRADEMARK OFFICE
CERTIFICATE OF CORRECTION

PATENT NO.         : 7,533,083 B2
APPLICATION NO. : 11/217428
DATED                : May 12, 2009
INVENTOR(S)      : Kazuma Aoki et al.

It is certified that error appears in the above-identified patent and that said Letters Patent is hereby corrected as shown below:

Column 27, Claim 9, Line 24:
  replace "belonging to the first user." with --belonging to the first user,--.

Column 27, Claim 9, Line 40:
  replace "matched information." with --matched information,--.

Signed and Sealed this

Tenth Day of November, 2009

David J. Kappos
*Director of the United States Patent and Trademark Office*